United States Patent
Kato

(10) Patent No.: US 9,810,398 B2
(45) Date of Patent: Nov. 7, 2017

(54) OPTICAL DEVICE

(71) Applicant: CITIZEN HOLDINGS CO., LTD., Nishitokyo-shi, Tokyo (JP)

(72) Inventor: Seiko Kato, Tokorozawa (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/359,636

(22) PCT Filed: Nov. 9, 2012

(86) PCT No.: PCT/JP2012/079193
§ 371 (c)(1),
(2) Date: May 21, 2014

(87) PCT Pub. No.: WO2013/077204
PCT Pub. Date: May 30, 2013

(65) Prior Publication Data
US 2014/0347608 A1    Nov. 27, 2014

(30) Foreign Application Priority Data
Nov. 25, 2011    (JP) .................................. 2011-258133

(51) Int. Cl.
*G02F 1/1335* (2006.01)
*F21V 5/00* (2015.01)
(Continued)

(52) U.S. Cl.
CPC ............ *F21V 5/008* (2013.01); *G02B 27/281* (2013.01); *G02F 1/0136* (2013.01); *G02F 1/13* (2013.01);
(Continued)

(58) Field of Classification Search
CPC ....... F21V 5/008; G02F 1/133528; G02F 1/13; G02F 1/0136; G02F 2001/133637;
(Continued)

(56) References Cited

U.S. PATENT DOCUMENTS 5,854,665 A    12/1998    Iba
6,273,571 B1 *    8/2001    Sharp .................. G02B 5/3083
                                                                   348/742

(Continued)

FOREIGN PATENT DOCUMENTS

EP    2485089 A1    8/2012
JP    07-013151 A    1/1995
(Continued)

OTHER PUBLICATIONS

Communication dated Jul. 9, 2015 from the European Patent Office in counterpart application No. 12850856.1.
(Continued)

*Primary Examiner* — Charles Chang
(74) *Attorney, Agent, or Firm* — Sughrue Mion, PLLC

(57) ABSTRACT

An optical device (100) includes laser light sources (111 to 113), polarization films (121 to 123), and a stacked wave plate (130). The laser light sources (111 to 113) respectively output light of a different wavelength. The stacked wave plate (130) includes multiple wave plates (131 to 133) and induces a phase difference on polarization components of transmitted light. The polarization films (121 to 123) adjust the polarization direction of the light such that an angle between polarization directions of the light emitted by the laser light sources (111 to 113) and input to the stacked wave plate (130) becomes an angle that corrects an orientation angle difference that occurs at the stacked wave plate (130), consequent to differences in the wavelength of the light.

13 Claims, 11 Drawing Sheets

(51) Int. Cl.
*G02F 1/13* (2006.01)
*G02B 27/28* (2006.01)
*G02F 1/01* (2006.01)
*G03B 21/20* (2006.01)
*G02F 1/13363* (2006.01)

(52) U.S. Cl.
CPC ... *G02F 1/133528* (2013.01); *G03B 21/2073* (2013.01); *G02F 2001/133637* (2013.01); *G02F 2001/133638* (2013.01); *G02F 2203/04* (2013.01)

(58) Field of Classification Search
CPC ..... G02F 2001/133638; G02F 2203/04; G02B 27/281; G03B 21/2073
USPC .................................................. 349/117–119
See application file for complete search history.

(56) References Cited

U.S. PATENT DOCUMENTS

| | | | |
|---|---|---|---|
| 2005/0180296 A1 | 8/2005 | Ooto | |
| 2006/0007538 A1* | 1/2006 | Robinson | G02B 27/102 359/487.04 |
| 2006/0215091 A1 | 9/2006 | Muramoto et al. | |
| 2008/0024700 A1 | 1/2008 | Yoshimi | |
| 2009/0086112 A1 | 4/2009 | Kaida et al. | |
| 2010/0053559 A1* | 3/2010 | Ushigome | G03B 21/2033 353/20 |
| 2012/0182484 A1* | 7/2012 | Imai | G03B 21/2033 348/744 |

FOREIGN PATENT DOCUMENTS

| | | |
|---|---|---|
| JP | 08-021998 A | 1/1996 |
| JP | 2003-259395 A | 9/2003 |
| JP | 2007219547 A | 8/2007 |
| JP | 2008-026797 A | 2/2008 |
| JP | 2008-070690 A | 3/2008 |
| JP | 2009-086164 A | 4/2009 |
| JP | 2010-091645 A | 4/2010 |
| JP | 2011-048192 A | 3/2011 |
| WO | 97/16763 A1 | 5/1997 |
| WO | 03/091768 A1 | 11/2003 |
| WO | 2006/098373 A1 | 9/2006 |
| WO | 2011/037026 A1 | 3/2011 |

OTHER PUBLICATIONS

Pancharatnam, "Achromatic Combinations of Birefringent Plates, Part 1. An Achromatic Circular Polarizer", Proceedings of the Indian Academy of Sciences, Sections A Physical Sciences, Indian Academy of Sciences, IN, vol. 41, No. 1, 1955, pp. 130-136, XP009071839.
Pancharatnam, "Achromatic Combinations of Birefringent Plates, Part 1. An Achromatic Circular Polarizer", Proceedings of the Indian Academy of Sciences, Sections A Physical Sciences, Indian Academy of Sciences, IN, vol. 41, No. 4, 1955, pp. 130-136, XP009071839.
Communication dated Jun. 27, 2016, issued by the European Patent Office in corresponding European Application No. 12 850 856.1.
Communication dated Apr. 26, 2016, from the Japanese Patent Office in counterpart application No. 2013-545876.
Communication dated Mar. 22, 2016, from the State Intellectual Property Office of the People's Republic of China in counterpart Application No. 201280057743.1.
Communication dated May 2, 2017, from the State Intellectual Property Office of the P.R.C., in counterpart Chinese application No. 201280057743.1.
Communication dated Jun. 21. 2017, from the European Patent Office in counterpart application No. 12850856.1.

* cited by examiner

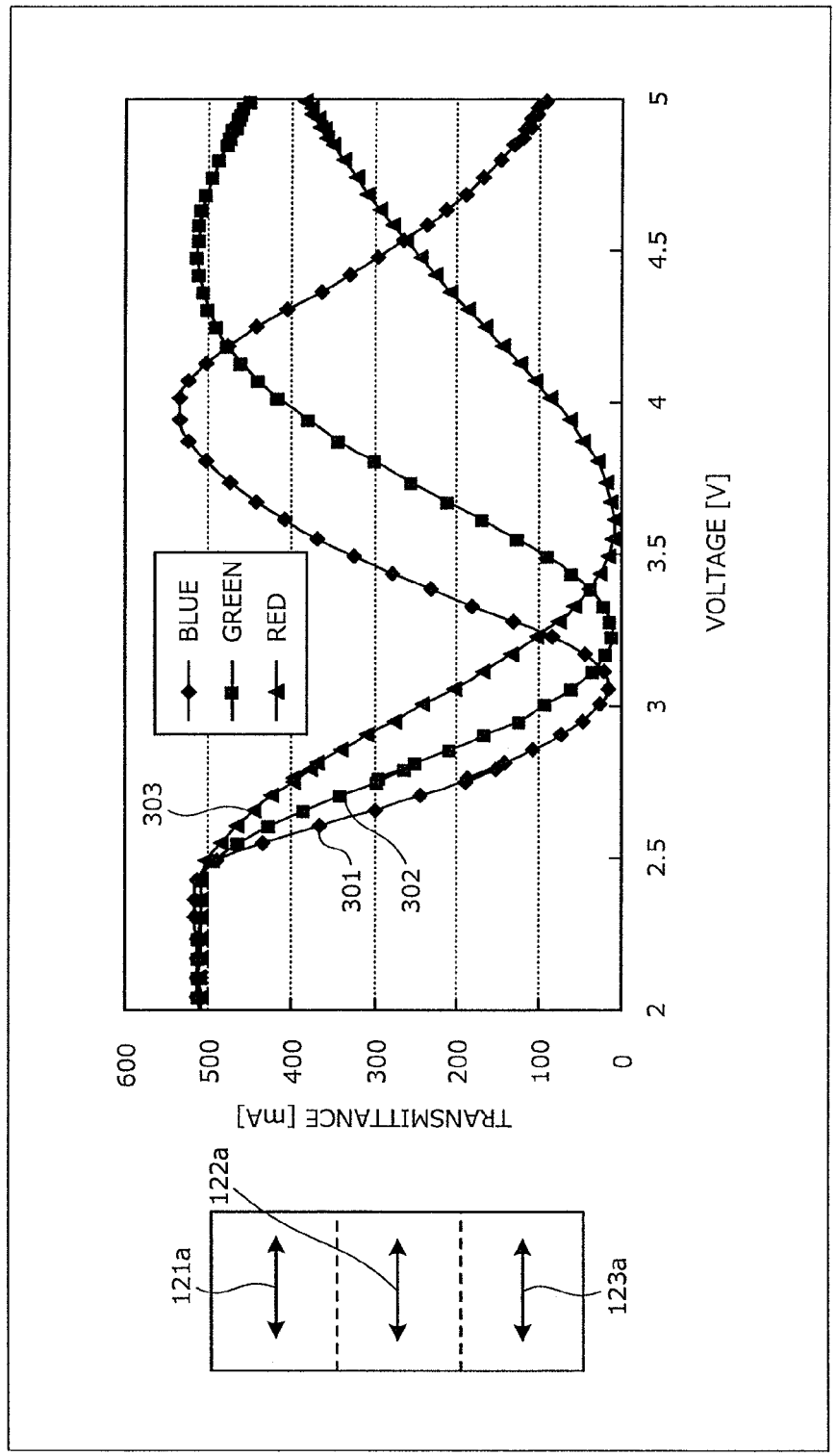

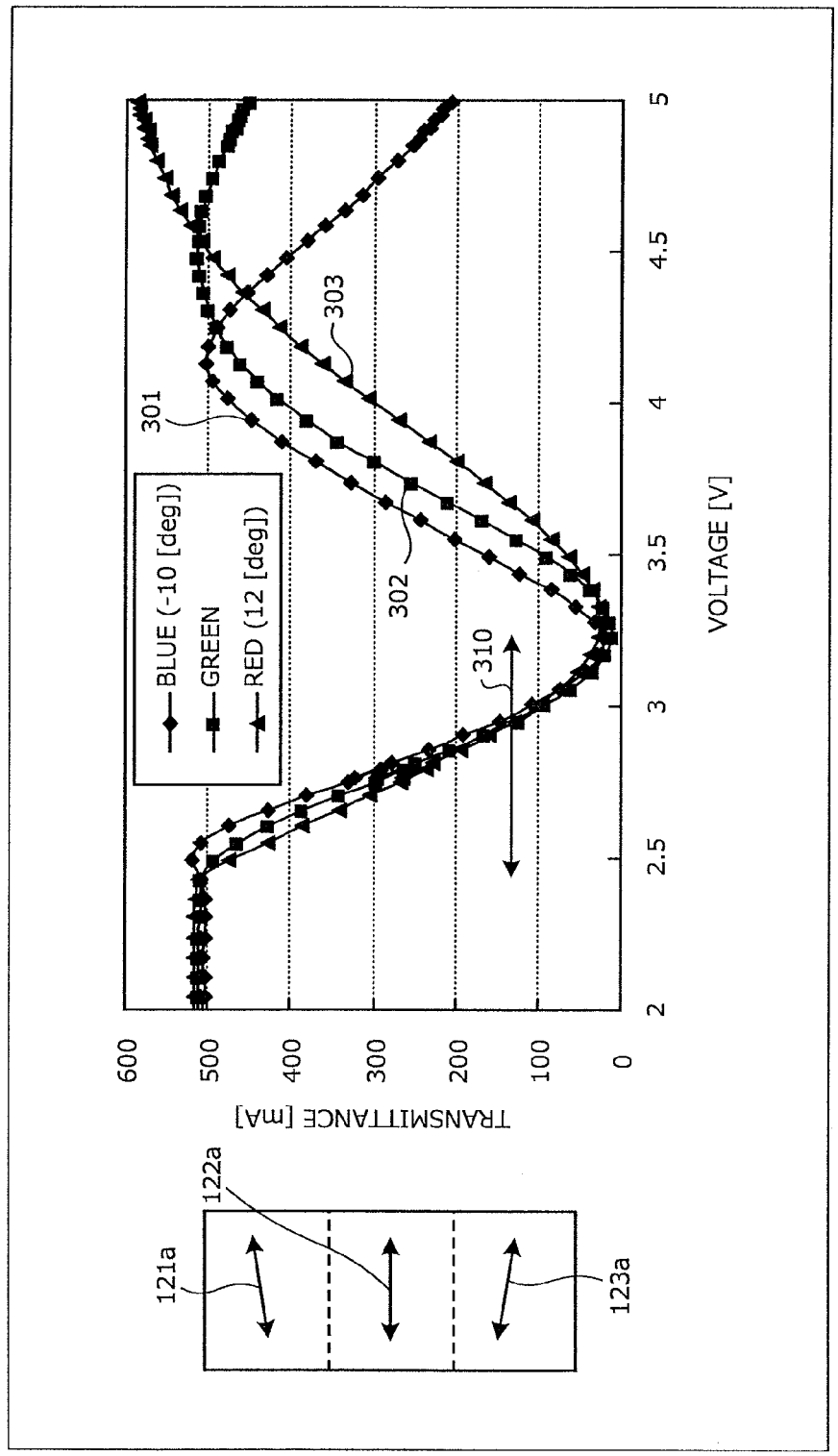

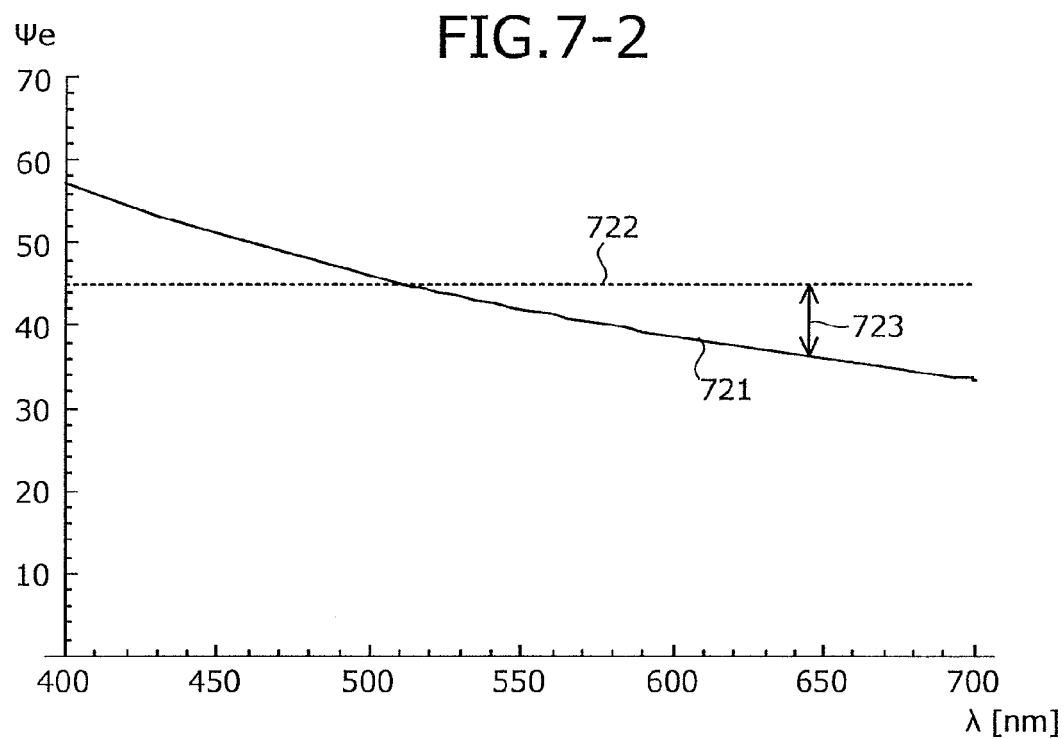

OPTICAL DEVICE

CROSS REFERENCE TO RELATED APPLICATIONS

This application is a National Stage of International Application No. PCT/JP2012/079193 filed Nov. 9, 2012, claiming priority based on Japanese Patent Application No. 2011-258133 filed Nov. 25, 2011, the contents of all of which are incorporated herein by reference in their entirety.

TECHNICAL FIELD

The present invention relates to an optical device configured to output light for which the direction of polarization has been adjusted.

BACKGROUND ART

It is known that a conventional wave plate induces a given phase difference (retardation) to polarization components of light emitted from an optical source such as a laser light source and thereby, adjusts the polarization direction of the light emitted from the optical source to output light for which the polarization direction is controlled. Wave plates include, for example, $\lambda/2$ wave plates that induce a phase difference of $\lambda/2$ (where, $\lambda$ is the wavelength of the light) on polarization components and $\lambda/4$ wave plates that induce a phase difference of $\lambda/4$ on polarization components. A wave plate, for example, that uses polarization film to transmit light of an amount that corresponds to the polarization direction is employed in an attenuator. Further, to implement a broadband wave plate, a stacked wave plate is known that is a combination of plural wave plates (for example, refer to Patent Documents 1 and 2 below).

Patent Document 1: Japanese Patent Application Laid-Open Publication No. 2008-070690

Patent Document 2: Published Japanese-Translation of PCT Application, Publication No. 2003/091768

DISCLOSURE OF INVENTION

Problem to be Solved by the Invention

Nonetheless, with the conventional technologies above, when light that includes plural wavelength components is input to the stacked wave plate, a problem arises in that the polarization direction of the light output from the stacked wave plate deviates according to wavelength component. Consequently, for example, a problem arises in that at an attenuator that uses a stacked wave plate and polarization film, the amount of attenuation of the output light deviates according to wavelength component (optical color).

To solve the problems of the conventional technologies, an object of the present invention is to provide an optical device that suppresses deviation of the polarization direction, occurring for each wavelength component.

Means for Solving Problem

To solve the problems above and achieve an object, one aspect of an optical device according to the present invention includes light sources that respectively emit light of a different wavelength; a stacked wave plate that includes wave plates that transmit the light emitted by the light sources and are disposed in series, and induces a phase difference on polarization components of the light transmitted by the wave plates; and a polarization adjusting unit that adjusts polarization directions of the light such that an angle between the polarization directions of the light emitted by the light sources and input to the stacked wave plate becomes an angle that corrects an orientation angle difference that occurs at the stacked wave plate and is caused by differences in the wavelengths of the light.

In this manner, by preliminarily adjusting the polarization directions of the light according to wavelength, differences in the retardation of the stacked wave plate consequent to the differences in the wavelengths of the light are corrected and deviation of the polarization directions of each wavelength component of the output light can be suppressed.

Effect of the Invention

According to the present invention, an effect of suppressing deviation of the polarization directions of each wavelength component is achieved.

BRIEF DESCRIPTION OF DRAWINGS

FIG. 4-1 is a graph depicting, for reference, an example of transmittance characteristics in a case where transmission polarization directions of polarization films for each wavelength are assumed to be identical (no tilting of the transmission polarization direction for any wavelength);

FIG. 4-2 is a graph (part 2) depicting an example of transmittance characteristics in the optical device depicted in FIG. 2;

FIG. 4-3 is a graph depicting, for reference, an example of transmittance characteristics in a case where in place of a stacked wave plate, a single liquid crystal cell is disposed and the transmission polarization directions of the polarization films are assumed to be identical;

FIG. 4-4 is a graph depicting, for reference, an example of transmittance characteristics in a case where in place of the stacked wave plate, a single liquid crystal cell is disposed and the transmission polarization directions of the polarization films are assumed to be staggered;

FIG. 7-1 is a graph depicting an example of characteristics of the retardation of the stacked wave plate with respect to wavelength;

FIG. 7-2 is a graph depicting an example of characteristics of the orientation angle of the stacked wave plate with respect to wavelength;

FIG. 8-1 is a diagram (part 1) depicting an example of ordinary axis directions and transmission polarization directions in the stacked wave plate, at the polarization films respectively corresponding to each wavelength;

FIG. 8-2 is a diagram (part 2) depicting an example of the ordinary axis directions and transmission polarization directions in the stacked wave plate, at the polarization films respectively corresponding to each the wavelength;

FIG. 9-1 is a diagram depicting a configuration example of a coupling unit;

FIG. 9-2 is a diagram depicting a first modification example of the coupling unit;

FIG. 9-3 is a diagram depicting a second modification example of the coupling unit; and FIG. 9-4 is a diagram depicting a third modification example of the coupling unit.

BEST MODE(S) FOR CARRYING OUT THE INVENTION

An embodiment of an optical device according to the present invention will be described in detail with reference to the accompanying drawings.

Embodiment (Configuration of Optical Device According to Embodiment)

Figure 1:
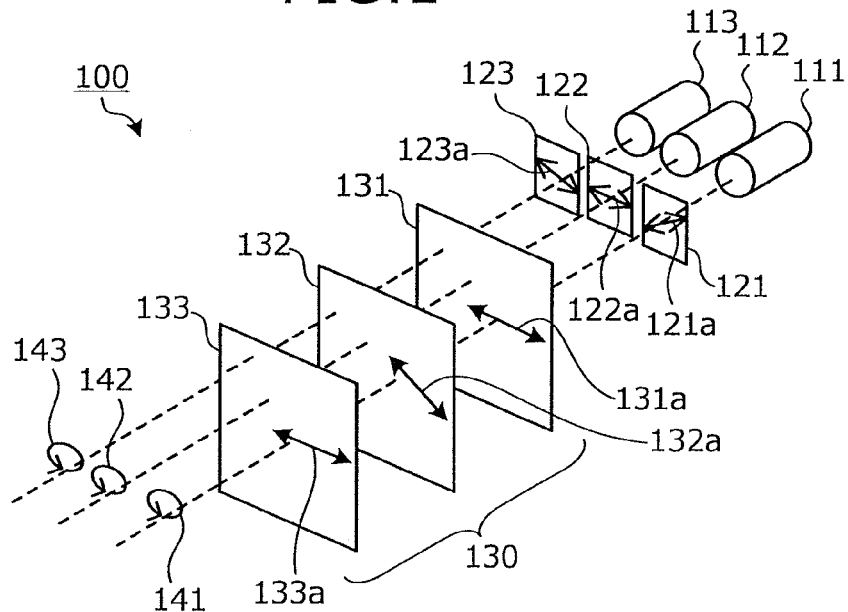
FIG. 1 is a diagram depicting an example of a configuration of an optical device according to an embodiment.

FIG. 1 is a diagram depicting an example of a configuration of the optical device according to the embodiment. As depicted in FIG. 1, an optical device 100 includes laser light sources 111 to 113, polarization films 121 to 123, and a stacked wave plate 130. The optical device 100 is an optical device that induces a given phase difference on polarization components of the laser light emitted by the laser light sources 111 to 113 and thereby, adjusts the polarization direction of the laser light to output light for which the polarization direction has been controlled.

The laser light sources 111 to 113 respectively output laser light of a different wavelength. For example, the laser light source 111 outputs blue (wavelength 450 [nm]) laser light. The laser light source 112 outputs green (wavelength 512 [nm]) laser light. The laser light source 113 outputs red (wavelength 650 [nm]) laser light.

The laser light output from the laser light sources 111 to 113 is input to the polarization films 121 to 123, respectively. Each of the laser light sources 111 to 113, for example, may be a laser apparatus that directly outputs laser light of each wavelength, or may be a second harmonic generation (SHG) laser apparatus.

The polarization films 121 to 123 are a polarization adjusting unit that adjusts the polarization directions of the light such that angles between the polarization directions of the light output by the laser light sources 111 to 113 and input to the stacked wave plate 130 becomes a given angle. The given angle is an angle that corrects orientation angle differences that occur in the stacked wave plate 130 consequent to the differences in optical wavelength (described hereinafter).

The polarization film 121 is a polarizer that, of the laser light emitted by the laser light source 111, transmits and outputs to the stacked wave plate 130, only a linear polarization component of a transmission polarization direction 121a. The polarization film 122 is a polarizer that, of the laser light emitted by the laser light source 112, transmits and outputs to the stacked wave plate 130, only a linear polarization component of a transmission polarization direction 122a.

The polarization film 123 is a polarizer that, of the laser light emitted by the laser light source 113, transmits and outputs to the stacked wave plate 130, only a linear polarization component of a transmission polarization direction 123a. The transmission polarization directions 121a, 122a, and 123a of the linear polarization components transmitted by the polarization films 121 to 123 are designed to be directions that respectively differ according to the wavelength of the laser light sources 111 to 113. The transmission polarization directions 121a, 122a, and 123a will be described in detail hereinafter.

If the laser light sources 111 to 113 emit linearly polarized laser light, the angles of the laser light sources 111 to 113 may be adjusted such that the polarization directions of the laser light from the laser light sources 111 to 113 substantially coincide with the transmission polarization directions 121a, 122a, and 123a, respectively. As a result, optical loss at the polarization films 121 to 123 can be suppressed. Further, in this case, the configuration can omit the polarization films 121 to 123. In such a case, a member that adjusts the angles of the laser light sources 111 to 113 is the polarization adjusting unit, which adjusts the polarization directions of the light.

The stacked wave plate 130 is operated as a wave plate that induces a given phase difference (retardation) on orthogonal polarization components of the light emitted from the laser light sources 111 to 113 and transmitted by the polarization films 121 to 123. For example, the stacked wave plate 130 is operated as a $\lambda/4$ plate that induces a $\lambda/4$ phase difference (where, $\lambda$ is optical wavelength) on the polarization components of the light from the polarization films 121 to 123, or as a $\lambda/2$ plate that induces a $\lambda/2$ phase difference on the polarization components of the light from the polarization films 121 to 123.

The stacked wave plate 130 includes wave plates 131 to 133 that are disposed in series. Each of the wave plates 131 to 133 is a birefringent element that causes a given phase difference between orthogonal polarization components of the transmitted light. The wave plate 131 is a first wave plate that transmits to the wave plate 132, the light output from the polarization films 121 to 123. The wave plate 132 is a second wave plate that transmits to the wave plate 133, the light output from the wave plate 131. The wave plate 133 is a third wave plate that transmits downstream, the light output from the wave plate 132. For example, the wave plates 131 and 133 are $\lambda/4$ plates, and the wave plate 132 is a $\lambda/2$ plate.

Ordinary axis directions 131a, 132a, and 133a are the directions of the ordinary axes of the wave plates 131 to 133, respectively. The ordinary axis (slow axis) is the axis for which the refractive index for birefringence is highest in the wave plate. In the example depicted in FIG. 1, the ordinary axis directions 131a, 132a, and 133a are designed for operating the stacked wave plate 130 as a $\lambda/4$ plate. More specifically, the ordinary axis directions 131a and 133a are set to be the same direction (a given direction). The ordinary axis direction 132a is set to a direction different from the ordinary axis directions 131a and 133a (the given direction).

Polarization directions 141 to 143 indicate polarization directions of the respective wavelength components: blue, green, and red, in the light output from the stacked wave plate 130. Since the ordinary axis directions 131a, 132a, and 133a are designed for operating the stacked wave plate 130 as a $\lambda/4$ plate, the polarization directions 141 to 143 are for circular polarization.

Downstream to the polarization films 121 to 123, a coupling unit may be disposed that maintains at the respective polarization directions, the light output from the polarization films 121 to 123 and that couples the light. The coupling unit, for example, can be disposed between the stacked wave plate 130 and the polarization films 121 to 123, or downstream to the stacked wave plate 130. An example of a configuration of the coupling unit will be described hereinafter (for example, refer to FIGS. 9-1 to 9-4).

Figure 2:
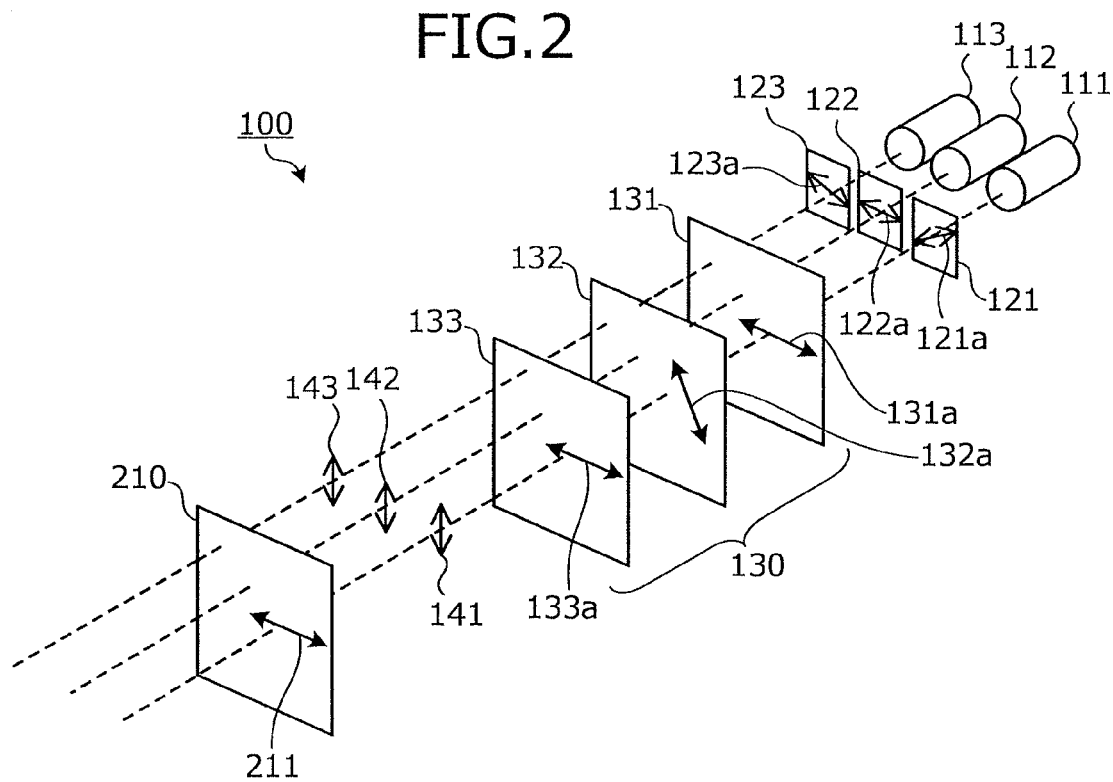
FIG. 2 is a diagram depicting an example of a modification of the optical device.

FIG. 2 is a diagram depicting an example of a modification of the optical device. In FIG. 2, components identical to those depicted in FIG. 1 are given the same reference numerals used in FIG. 1 and description thereof is omitted. As depicted in FIG. 2, downstream to the stacked wave plate 130 depicted in FIG. 1, a polarization film 210 is disposed, thereby enabling the optical device 100 to have a function of an attenuator.

In this case, for example, the ordinary axis directions 131a, 132a, and 133a of the wave plates 131 to 133 are designed for operating the stacked wave plate 130 as a λ/2 plate. As a result, the polarization directions 141 to 143 of the wavelength components in the light output from the stacked wave plate 130 are respectively for linear polarization.

Further, for example, the wave plate 132 is implemented by a liquid crystal cell. The liquid crystal cell changes the director orientation according to the voltage applied, whereby the phase difference induced on the polarization components of the transmitted light changes. As a result, by changing the voltage applied to the wave plate 132, the polarization directions 141 to 143 of the wavelength components in the light output from the stacked wave plate 130 can be changed.

The polarization film 210 is a polarizer that, of the light output from the stacked wave plate 130, transmits downstream, only a linear polarization component (given polarization component) of a polarization direction 211. As a result, by changing the polarization directions 141 to 143 by changing the voltage applied to the wave plate 132, the intensity of the light transmitted through the polarization film 210 can be changed.

Nematic liquid crystal, for example, can be used in the liquid crystal cell applied to the wave plate 132. Further, ferroelectric liquid crystal (FLC) can be used in the liquid crystal cell applied to the wave plate 132. As a result, control of the polarization direction can be performed at high-speed.

In the optical device 100 depicted in FIG. 2, for example, a coupling unit (for example, refer to FIGS. 9-1 to 9-4) can be disposed between the stacked wave plate 130 and the polarization films 121 to 123, or between the stacked wave plate 130 and the polarization film 210, or downstream from the polarization film 210.

(Transmittance Property of Optical Device)

Figure 3:
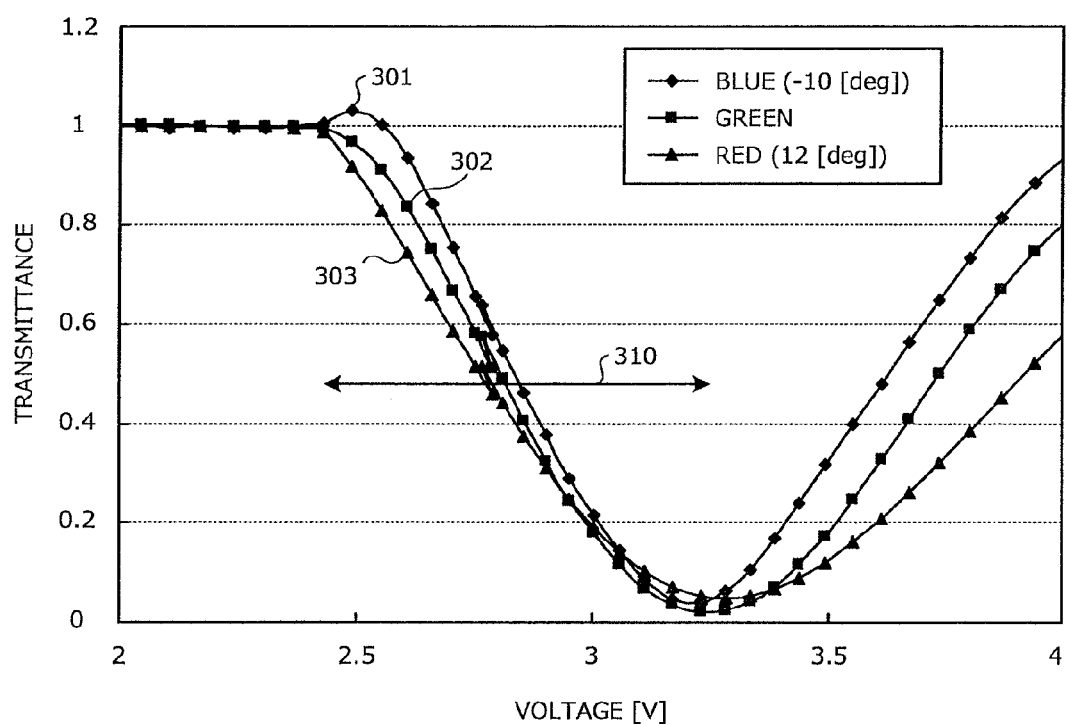
FIG. 3 is a graph (part 1) depicting an example of transmittance characteristics of the optical device depicted in FIG. 2.

FIG. 3 is a graph (part 1) depicting an example of the transmittance characteristics of the optical device depicted in FIG. 2. In FIG. 3, the horizontal axis indicates the voltage [V] applied to the wave plate 132 implemented by a liquid crystal cell. The vertical axis indicates the transmittance (transmission rate) of the polarization film 210 with respect to the light output from the stacked wave plate 130.

In the example depicted in FIG. 3, in the optical device 100 depicted in FIG. 2, the transmission polarization direction 121a of the polarization film 121 for blue laser light is assumed to be tilted −10 [deg] with respect to the given direction (the ordinary axis directions 131a and 133a of the wave plates 131 and 133). Further, the transmission polarization direction 122a of the polarization film 122 for green laser light is assumed to be parallel to the given direction. The transmission polarization direction 123a of the polarization film 123 for red laser light is assumed to be tilted 12 [deg] with respect to the given direction. A calculation method for these tilted angles will be described hereinafter.

Transmittance characteristics 301 are characteristics of the transmittance of the blue laser light through the polarization film 210 when voltage is applied to the wave plate 132. Transmittance characteristics 302 are characteristics of the transmittance of the green laser light through the polarization film 210 when voltage is applied to the wave plate 132. Transmittance characteristics 303 are characteristics of the transmittance of the red laser light through the polarization film 210 when voltage is applied to the wave plate 132.

By changing the voltage applied to the wave plate 132, the phase difference (retardation) occurring in the polarization components at the stacked wave plate 130 changes, whereby the polarization directions 141 to 143 of the light output from the stacked wave plate 130 change. Consequently, by changing the voltage applied to the wave plate 132 and as indicated by the transmittance characteristics 301 to 303, at the polarization film 210, the transmittance of the light output from the stacked wave plate 130 can be changed. For example, by controlling the voltage applied to the wave plate 132 to be within a range 310, in which the transmitted amount of light for the transmittance characteristics 301 to 303 changes uniformly, the intensity of the output light can be controlled simply.

Further, according to the optical device 100, by an adjustment of the transmission polarization directions 121a to 123a of the polarization films 121 to 123, as indicated by the transmittance characteristics 301 to 303, the transmittance of each wavelength component changes uniformly with respect to the voltage applied to the wave plate 132. As a result, changes in the relative intensities of the wavelength components can be suppressed and the optical intensity of the output light can be controlled.

Figures 3, 4:
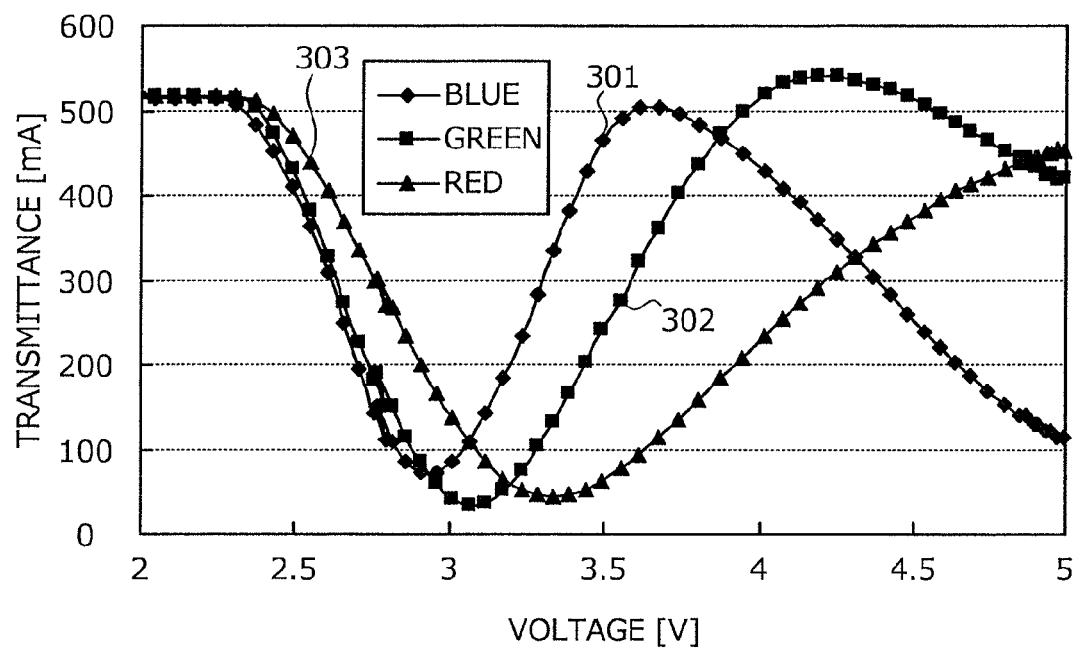
Figure 4:
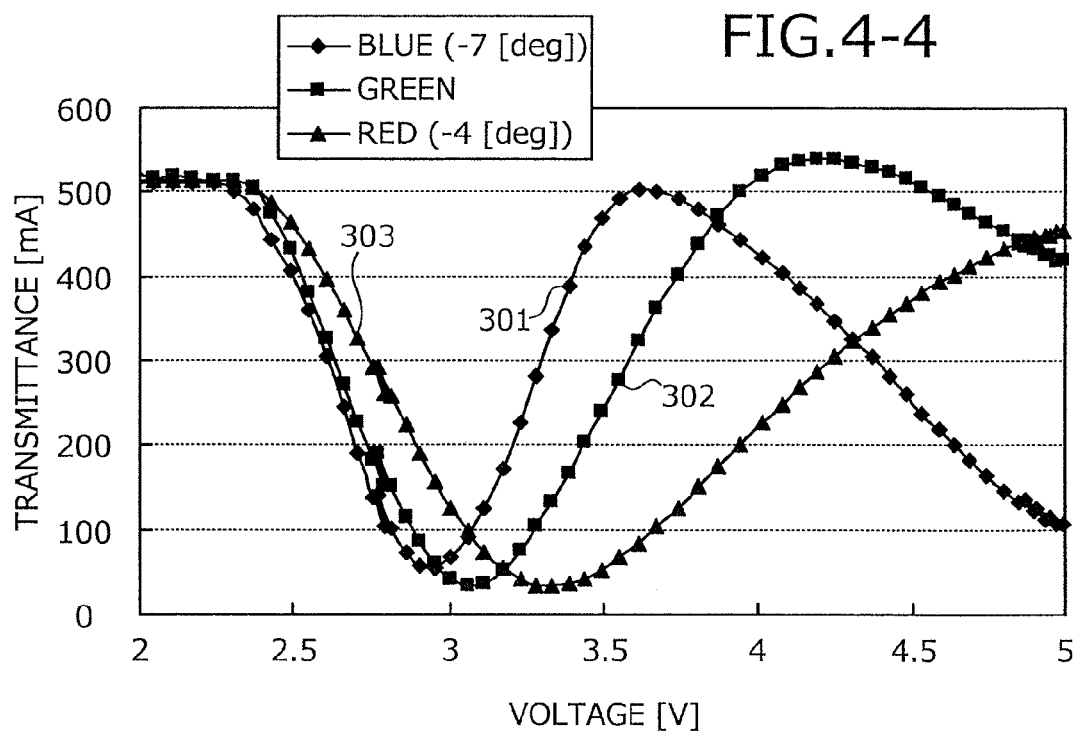

FIG. 4-1 is a graph depicting, for reference, an example of transmittance characteristics in a case where the transmission polarization directions of the polarization films for each of the wavelengths are assumed to be identical (no tilting of the transmission polarization direction for any of the wavelengths). In FIG. 4-1, portions identical to those depicted in FIG. 2 or FIG. 3 are given the same reference numerals used in FIGS. 2 and 3, and description thereof is omitted. In FIG. 4-1, the transmittance on the vertical axis is indicated by the electrical power [mA] of the received light in a case where the light output from the polarization film 210 is received (similarly for FIGS. 4-2 to 4-4).

Assuming the transmission polarization directions 121a to 123a of the polarization films 121 to 123 are identical, as indicated by the transmittance characteristics 301 to 303 depicted in FIG. 4-1, the change in transmittance varies among the wavelength components with respect to the voltage applied to the wave plate 132. Consequently, when the optical intensity of the output light is controlled, the relative intensities of the wavelength components change.

For example, when light for which color has been adjusted by the relative intensities of the light output from the laser light sources 111 to 113 is to be output from the optical device 100, if the relative intensities of the wavelengths change at the stacked wave plate 130, light of an unintended color is output from the optical device 100.

FIG. 4-2 is a graph (part 2) depicting an example of transmittance characteristics in the optical device depicted in FIG. 2. In FIG. 4-2, portions identical to those depicted in FIG. 2 or FIG. 3 are given the same reference numerals used in FIGS. 2 and 3, and description thereof is omitted. In FIG. 4-2, under the same conditions as in the example depicted in FIG. 3, the transmittance on the vertical axis is indicated by the electrical power [mA] of the received light in a case where the light output from the polarization film 210 is received. In FIG. 4-2, similar to FIG. 4-1, the voltage on the horizontal axis is depicted from 2 [V] to 5 [V].

As indicated by the transmittance characteristics 301 to 303 depicted in FIG. 4-2, according to the optical device 100 that staggers the transmission polarization directions 121a to 123a of the polarization films 121 to 123, for example, the transmittance of each wavelength component can be changed uniformly within the voltage range 310. Consequently, changes in the relative intensities of the wavelength components can be suppressed and the optical intensity of the output light can be controlled.

For example, when light for which color has been adjusted by the relative intensities of the light respectively emitted from the laser light sources 111 to 113 is to be output from the optical device 100, changes in the relative intensities of the wavelength components can be suppressed. As a result, light of an intended color can be output.

FIG. 4-3 is a graph depicting, for reference, an example of transmittance characteristics in a case where in place of the stacked wave plate, a single liquid crystal cell is disposed and the transmission polarization directions of the polarization films are assumed to be identical. In FIG. 4-3, portions identical to those depicted in FIG. 4-1 are given the same reference numerals used in FIG. 4-1, and description thereof is omitted. The stacked wave plate 130 depicted in FIG. 2 is assumed to be replaced by a single liquid crystal cell and the transmission polarization directions 121a to 123a of the polarization films 121 to 123 are assumed to be identical (no tilting of the transmission polarization direction for any of the wavelengths).

In this case, as indicated by the transmittance characteristics 301 to 303 depicted in FIG. 4-3, the change in transmittance varies among the wavelength components with respect to the voltage applied to the wave plate 132. Consequently, when the optical intensity of the output light is controlled, the relative intensities of the wavelength components change.

FIG. 4-4 is a graph depicting, for reference, an example of transmittance characteristics in a case where in place of the stacked wave plate, a single liquid crystal cell is disposed and the transmission polarization directions of the polarization films are assumed to be staggered. In FIG. 4-4, portions identical to those depicted in FIG. 4-1 are given the same reference numerals used in FIG. 4-1 and description thereof is omitted. The stacked wave plate 130 depicted in FIG. 2 is assumed to be replaced with a single liquid crystal cell and the transmission polarization directions 121a to 123a of the polarization films 121 to 123 are assumed to be staggered.

More specifically, the transmission polarization direction 121a of the polarization film 121 for blue laser light is assumed to be tilted −7 [deg] with respect to the given direction. Further, the transmission polarization direction 122a of the polarization film 122 for green laser light is assumed to be parallel to the given direction. The transmission polarization direction 123a of the polarization film 123 for red laser light is assumed to be tilted −4 [deg] with respect to the given direction. In this case as well, as indicated by the transmittance characteristics 301 to 303 depicted in FIG. 4-4, the change in transmittance varies among the wavelength components with respect to the voltage applied to the wave plate 132. Consequently, when the optical intensity of the output light is controlled, the relative intensities of the wavelength components change.

As depicted in FIGS. 4-1 to 4-4, staggering the transmission polarization directions 121a to 123a in the optical device 100 equipped with the stacked wave plate 130, enables a uniform change to be effected in the polarization directions (transmittance) of the wavelengths with respect to the voltage applied.

(Stacked Wave Plate Operation)

Figure 5:
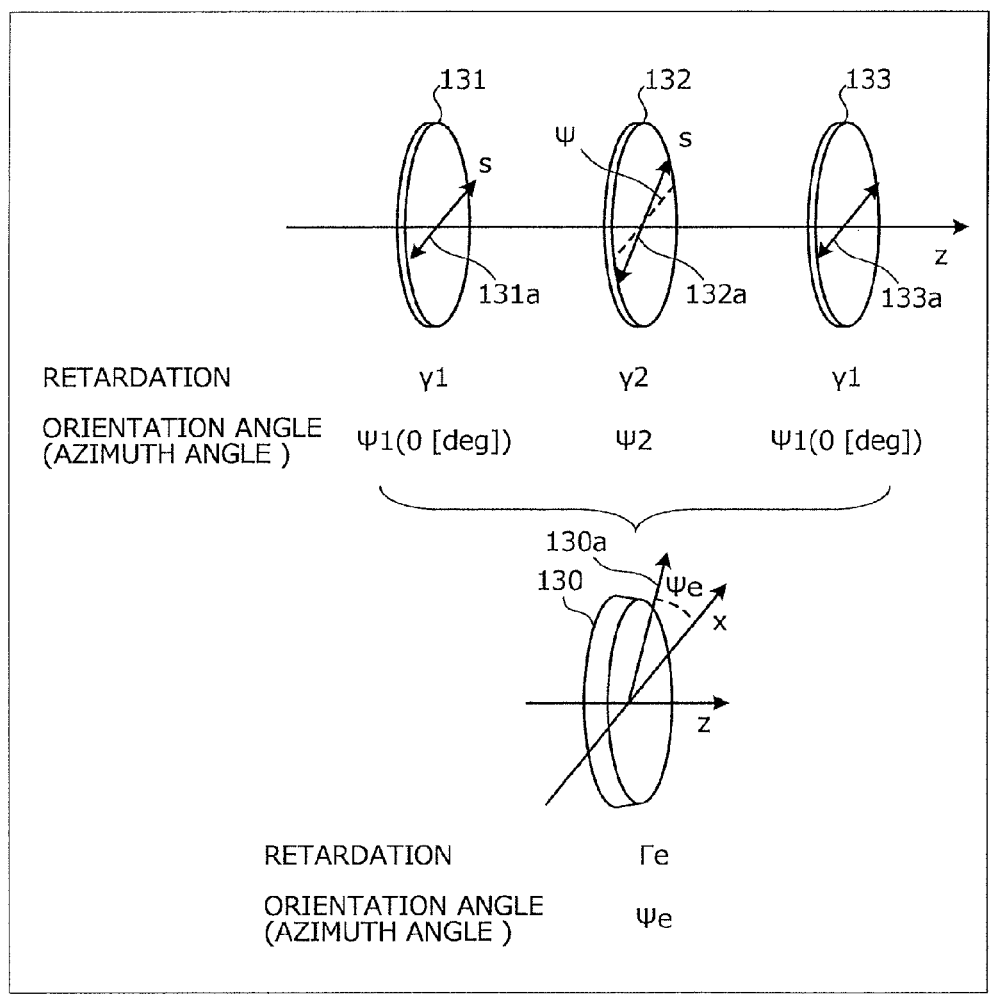
FIG. 5 is a diagram depicting an example of operation of the stacked wave plate.

FIG. 5 is a diagram depicting an example of operation of the stacked wave plate. In FIG. 5, components identical to those depicted in FIG. 1 or FIG. 2 are given the same reference numerals used in FIGS. 1 and 2, and description thereof is omitted. In FIG. 5, the x axis corresponds to the given direction above (0 [deg]). The z axis corresponds to the travel direction of the light. Retardation of the wave plates 131, 133 depicted in FIG. 5 is assumed to be γ1, respectively. Further, orientation angles (azimuth angle) between the given direction in the wave plates 131 and 133 and the ordinary axis directions 131a and 133a are assumed to be Ψ1, respectively.

Retardation of the wave plate 132 is assumed to be γ2; and the orientation angle between the given direction of the wave plate 132 and the ordinary axis direction 132a is assumed to be Ψ2. Here, the direction of the ordinary axis directions 131a and 133a of the wave plates 131 and 133 is defined as a reference of 0 [deg]. In this case, the orientation angle Ψ1 of the wave plates 131 and 133 is 0 [deg]. Accordingly, the orientation angle Ψ between the wave plate 132 and the wave plates 131 and 133 is Ψ=Ψ2−Ψ1=Ψ2.

The stacked wave plate 130 depicted in FIG. 5 is assumed to have the stacked wave plate 130 formed by the wave plates 131 to 133, as 1 wave plate. The ordinary axis direction 130a indicates the direction of an assumed ordinary axis of the stacked wave plate 130. Retardation of the stacked wave plate 130 is assumed to be Γe. The orientation angle between the ordinary axis direction 130a of the stacked wave plate 130 and the given direction is assumed to be Ψe.

The retardation Γe of the stacked wave plate 130 and the orientation angle Ψe can be expressed as Equations (1) and (2) by a calculation based on the retardation γ1 and γ2 of the wave plates 131 to 133, the orientation angle Ψ and Jones matrices.

$$\cos(\Gamma e/2) = \cos^2\Psi\cos(\gamma1+\gamma2/2) + \sin^2\Psi\cos(\gamma1-\gamma2/2) \quad (1)$$

$$\sin(2\Psi e) = \frac{\sin(\gamma2/2)\sin(2\Psi)}{\sin(\Gamma e/2)} \quad (2)$$

In Equations (1) and (2), retardation γx of a wave plate x (the wave plates 131 to 133) changes according to the wavelength of the transmitted light as indicated by Equation (3). In Equation (3), Δnx is the refractive index (birefringence) of the wave plate x. Typically, the refractive index n of a wave plate is n=ne−no. "ne" is the refractive index for the direction of the extraordinary axis (fast axis) of the wave plate. The extraordinary axis is the axis for which the refractive index for birefringence is lowest. "no" is the refractive index for the direction of the ordinary axis of the wave plate. "Δnx" is determined, for example, by the material of the wave plate x, the wavelength of the transmitted light, etc. The wavelength dependency of Δnx will be discussed hereinafter. "dx" is the thickness of the wave plate x.

$$\gamma x = 2\pi \cdot \Delta nx \cdot dx/\lambda \quad (3)$$

To use the stacked wave plate 130 over a broad band, since it is sufficient for the retardation Γe of the stacked wave plate 130 to not be affected by refractive index changes consequent to wavelength differences of the wave plate x, the retardation Γe satisfies, for example, Equation (4).

$$\frac{\partial}{\partial \gamma1}\Gamma e = 0, \frac{\partial}{\partial \gamma2}\Gamma e = 0 \quad (4)$$

For example, when $\gamma1=\pi/2$ or $\gamma1=3\pi/2$, and $\gamma2=\pi$ are satisfied, irrespective of the orientation angle $\Psi$ between the wave plate 132 and the wave plates 131 and 133, Equation (4) is satisfied. By substituting $\gamma1=\pi/2$ or $\gamma1=3\pi/2$, and $\gamma2=\pi$ into Equations (1) and (2), Equations (5) and (6) are yielded.

$$\cos(\Gamma e/2)=\sin^2\Psi-\cos^2\Psi=-\cos(2\Psi) \quad (5)$$

$$\sin(2\Psi e)=1 \quad (6)$$

Therefore, by changing the orientation angle $\Psi$ between the wave plate 132 and the wave plates 131 and 133, an arbitrary retardation $\Gamma e$ can be realized. For example, when the stacked wave plate 130 is used as a $\lambda/2$ plate, the retardation suffices to be $\Gamma e=\pi\times(2n-1)$. To this end, the orientation angle $\Psi$ between the wave plate 132 and the wave plates 131 and 133 suffices to be 45 [deg] or 135 [deg], i.e., $\pi/4\times(2n-1)$ (where, n is a natural number).

Further, when the stacked wave plate 130 is used as a $\lambda/4$, the retardation suffices to be $\Gamma e=\pi/2\times(2n-1)$. To this end, the orientation angle $\Psi$ between the wave plate 132 and the wave plates 131 and 133 suffices to be 22.5 [deg], 67.5 [deg], 112.5 [deg], or 157.5 [deg], i.e., $\pi/8\times(2n-1)$.

Nonetheless, as described, the retardation $\gamma x$ of the wave plate x (the wave plates 131 to 133) is dependent on wavelength. In this regard, as described, by stacking the wave plates, even if the retardation $\gamma x$ of the wave plates 131 to 133 is dependent on wavelength, an arbitrary retardation $\Gamma e$ (e.g., $\lambda/2$, $\lambda/4$, etc.) can be obtained with respect to the light output from the stacked wave plate 130.

First, with respect to the light emitted from one of the laser light sources 111 to 113, the wave plates 131 to 133 are designed such that a desired retardation $\Gamma e$ is induced. Here, a retardation $\Gamma e$ of $\lambda/4$ is assumed to be induced. Further, the wavelength (blue) of the laser light source 111 is assumed to be $\lambda B$; the wavelength (green) of the laser light source 112 is assumed to be $\lambda G$; and the wavelength (red) of the laser light source 113 is assumed to be $\lambda R$. For example, the wave plates 131 to 133 are designed such that a desirable retardation $\Gamma e$ is induced on the light of the wavelength $\lambda G$, which is an intermediate wavelength among the wavelengths $\lambda B$, $\lambda G$, and $\lambda R$. As a result, deviation occurring at each of the wavelengths can be reduced.

To induce a desirable retardation $\Gamma e$ on the light of the wavelength $\lambda G$, the wave plates 131 to 133 are designed such that $\gamma1=\pi/2$ or $3\pi/2$, and $\gamma2=\pi$ are satisfied. More specifically, for the wave plates 131 and 133, the refractive index $\Delta n$ and the thickness d are designed such that the conditions of Equation (7), which is derived from Equation (3), $\lambda=\lambda G$ and, $\gamma=\pi/2$ or $3\pi/2$, are satisfied; where, $\gamma1(G)$ is the retardation for the light of the wavelength $\lambda G$ at the wave plates 131 and 133.

$$\gamma1(G)=2\pi\cdot\Delta n\cdot d/\lambda G=\pi/2 \text{ (or } 2\pi/3) \quad (7)$$

Further, for the wave plate 132, the refractive index $\Delta n$ and the thickness d are designed such that the conditions of Equation (8), which is derived from Equation (3), $\lambda=\lambda G$, and $\gamma=\pi$ are satisfied; where, $\gamma2(G)$ is the retardation for the light of the wavelength $\lambda G$ at the wave plate 132.

$$\gamma2(G)=2\pi\cdot\Delta n\cdot d/\lambda G=\pi \quad (8)$$

In Equations (7) and (8), the refractive index $\Delta n$ also changes according to wavelength $\lambda$. For example, the refractive index $\Delta n$ can be approximated by $\Delta n=a+b/\lambda^2+c/\lambda^4+d/\lambda^6\ldots$ from the Cauchy dispersion equation; where, a, b, c, d, ... are coefficients specific to the material of the wave plate. In the description hereinafter, for example, the refractive index $\Delta n$ is approximated by $a+b/\lambda^2+c/\lambda^4$ (up to the third term). Therefore, Equation (3) can be approximated as indicated by Equation (9).

$$\gamma=2\pi\cdot(a+b/\lambda^2+c/\lambda^4)\cdot d/\lambda \quad (9)$$

Here, the coefficients a, b, and c for the wave plates 131 and 133 are assumed to be a1, b1, and c1, respectively. The thickness d of the wave plates 131 and 133 is assumed to be d1. The coefficients a, b, and c for the wave plate 132 are assumed to be a2, b2, and c2, respectively. The thickness d of the wave plate 132 is assumed to be d2.

In this case, the retardation $\gamma1(B)$ of the wave plates 131 and 133 with respect to light of the wavelength $\lambda B$ is as expressed by Equation (10). Further, the retardation $\gamma2(B)$ of the wave plate 132 with respect to light of the wavelength $\lambda B$ is as expressed by Equation (11).

$$\gamma1(B)=2\pi\cdot(a1+b1/\lambda B^2+c1/\lambda B^4)\cdot d1/\lambda B \quad (10)$$

$$\gamma2(B)=2\pi\cdot(a2+b2/\lambda B^2+c2/\lambda B^4)\cdot d2/\lambda B \quad (11)$$

The retardation $\gamma1(R)$ of the wave plates 131 and 133 with respect to light of the wavelength $\lambda R$ is as expressed by Equation (12). The retardation $\gamma2(R)$ of the wave plate 132 with respect to light of the wavelength $\lambda R$ is as expressed by Equation (13).

$$\gamma1(R)=2\pi\cdot(a1+b1/\lambda R^2+c1/\lambda R^4)\cdot d1/\lambda R \quad (12)$$

$$\gamma2(R)=2\pi\cdot(a2+b2/\lambda R^2+c2/\lambda R^4)\cdot d2/\lambda R \quad (13)$$

Here, transformation of Equations (1) and (2) yields Equations (14) and (15).

$$\Gamma e = \arccos(\cos^2\Psi\cos(\gamma1+\gamma2/2)+\sin^2\Psi\cos(\gamma1-\gamma2/2))\times 2 \quad (14)$$

$$\Psi e = \arcsin\left[\frac{\sin(\gamma2/2)\sin(2\psi)}{\sin(\Gamma e/2)}\right]\times\frac{1}{2} \quad (15)$$

By substituting into Equations (14) and (15), $\gamma1$ and $\gamma2$ from Equations (10) to (13), Equations (16) and (17) are obtained.

$$\Gamma e = \arccos[\cos^2\Psi\cos\{2\pi\cdot(a1+b1/\lambda^2+c1/\lambda^4)\cdot d1/\lambda + \quad (16)$$
$$\pi\cdot(a2+b2/\lambda^2+c2/\lambda^4)\cdot d2/\lambda\} +$$
$$\sin^2\Psi\cos\{2\pi\cdot(a1+b1/\lambda^2+c1/\lambda^4)\cdot d1/\lambda -$$
$$\pi\cdot(a2+b2/\lambda^2+c2/\lambda^4)\cdot d2/\lambda\}]\times 2$$

$$\Psi e = \arcsin\left[\frac{\sin\{\pi\cdot(a2+b2/\lambda^2+c2/\lambda^4)\cdot d2/\lambda\}\sin(2\Psi)}{\sin(\Gamma e/2)}\right]\times\frac{1}{2} \quad (17)$$

As described, to obtain a retardation $\Gamma e$ of $\lambda/4$, the orientation angle $\Psi$ between the wave plate 132 and the wave plates 131 and 133 is assumed to be $\pi/8\times(2n-1)$. Further, to obtain a retardation $\Gamma e$ of $\lambda/2$, the orientation angle $\Psi$ between the wave plate 132 and the wave plates 131 and 133 is assumed to be $\pi/4\times(2n-1)$. Therefore, by substituting any one of the values of the orientation angle $\Psi$ corresponding to the desired retardation $\Gamma e$ among these retardations and by substituting the wavelength $\lambda B$ or the wavelength $\lambda R$ for $\lambda$ in Equations (16) and (17), the values of the retardation $\Gamma e$ and the orientation angle $\Psi e$ of the stacked wave plate 130 for the wavelength $\lambda B$ or the wavelength $\lambda R$ are obtained.

(Characteristics of Retardation of Stacked Wave Plate with Respect to Orientation Angle)

Figure 6:
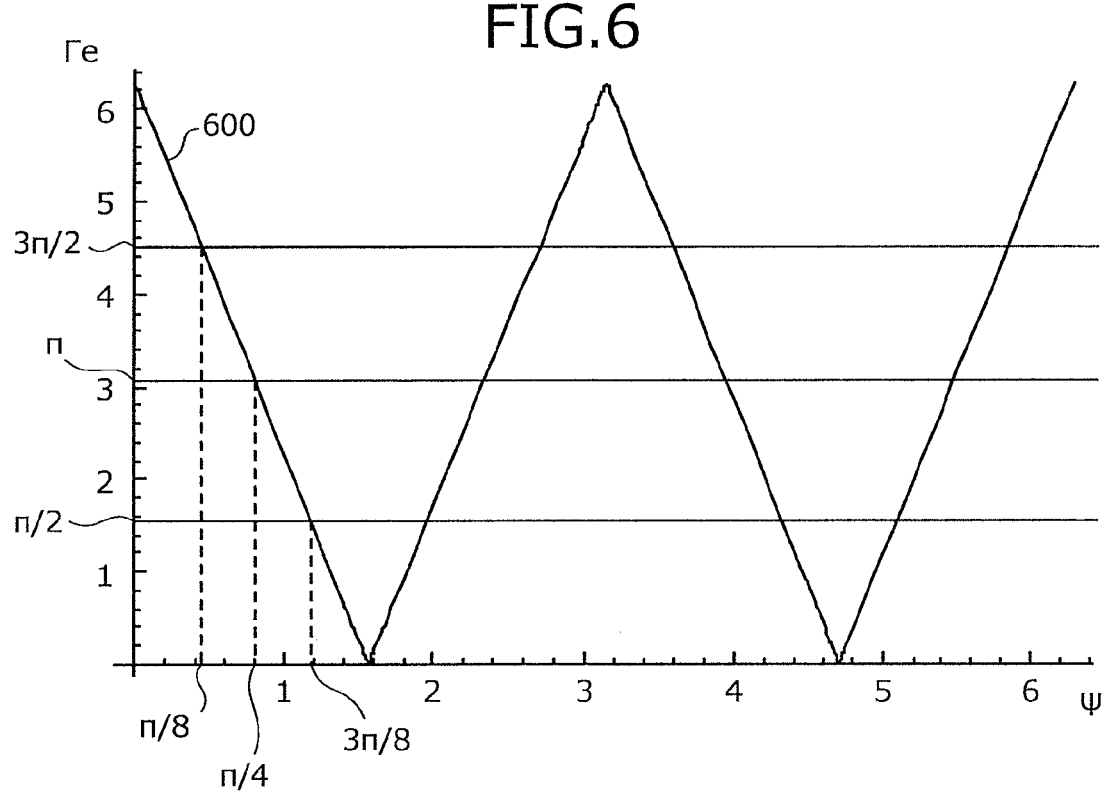
FIG. 6 is a graph depicting an example of characteristics of retardation of the stacked wave plate with respect to orientation angle.

FIG. 6 is a graph depicting an example of characteristics of the retardation of the stacked wave plate with respect to orientation angle. In FIG. 6, the horizontal axis indicates the orientation angle Ψ between the wave plate 132 and the wave plates 131 and 133. The vertical axis indicates the retardation Γe of the stacked wave plate 130. Retardation characteristics 600 indicate the characteristics of the retardation Γe with respect to the orientation angle Ψ. As indicated by the retardation characteristics 600, the retardation Γe of the stacked wave plate 130 changes between 0 and $2\pi$ according to the orientation angle Ψ between the wave plate 132 and the wave plates 131 and 133.

(Characteristics of Retardation of Stacked Wave Plate with Respect to Wavelength)

Figures 1, 7:
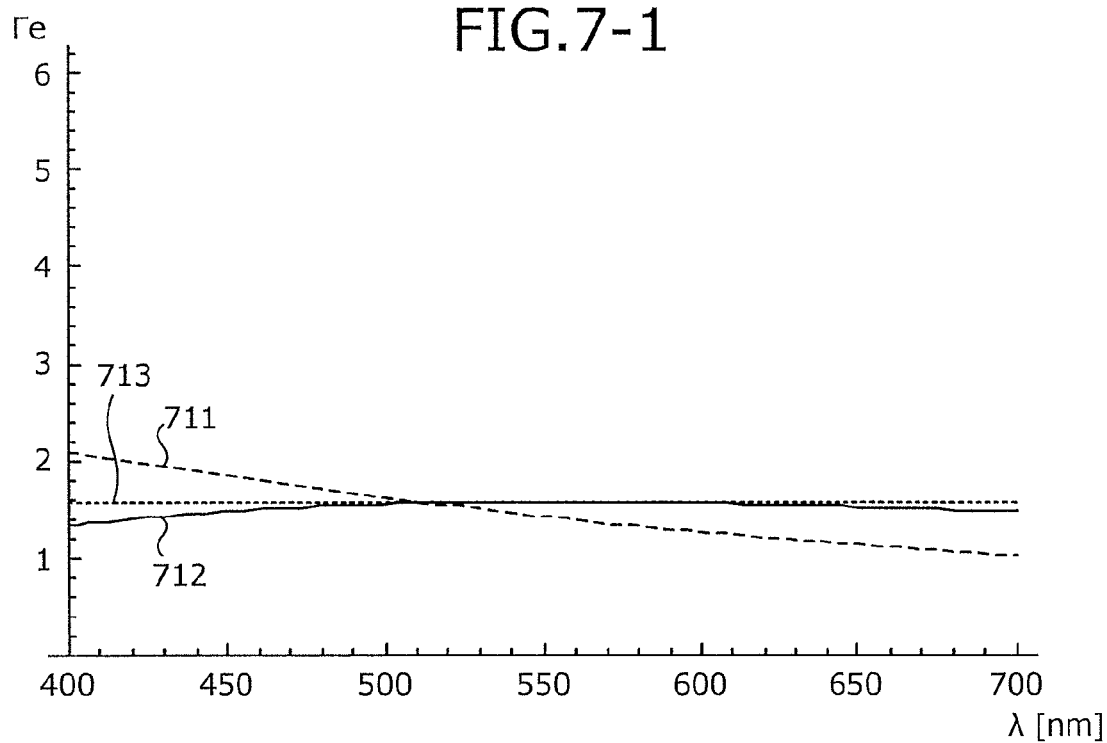

FIG. 7-1 is a graph depicting an example of characteristics of the retardation of the stacked wave plate with respect to wavelength. In FIG. 7-1, the horizontal axis indicates the wavelength λ[nm] of the light. The vertical axis indicates the retardation Γe of the stacked wave plate 130. Retardation characteristics 711 are characteristics of the retardation Γe with respect to the wavelength λ of a single λ/4 plate, which a conventional stacked structure does not have.

Retardation characteristics 712 are characteristics of the retardation Γe with respect to the wavelength λ in the stacked wave plate 130, which includes the wave plates 131 to 133 and is operated as a λ/4 plate. Retardation characteristics 713 are characteristics of ideal retardation Γe and indicate constant retardation with respect to the wavelength λ.

In the example depicted in FIG. 7-1, as described above, the wave plates 131 to 133 are designed such that a desired retardation is induced on the light of the wavelength λG, even without a tilting of the transmission polarization direction 122a. Consequently, as indicated by the retardation characteristics 712, the retardation Γe for about 512 [nm], which corresponds to the wavelength λG, is the closest to the ideal retardation characteristics 713.

FIG. 7-2 is a graph depicting an example of characteristics of the orientation angle of the stacked wave plate with respect to wavelength. In FIG. 7-2, the horizontal axis indicates the wavelength λ[nm] of the light. The vertical axis indicates the orientation angle Ψe of the stacked wave plate 130. Orientation angle characteristics 721 are characteristics of the orientation angle Ψe of the stacked wave plate 130 with respect to wavelength λ. Orientation angle characteristics 722 are characteristics of the ideal orientation angle Ψe and indicate an angle of 45 [deg].

As described, the wave plates 131 to 133 are designed such that a desired retardation is induced on the light of the wavelength λG, even without a tilting of the transmission polarization direction 122a. Consequently, as indicated by the orientation angle characteristics 721, the orientation angle Ψe for about 512[nm], which corresponds to the wavelength λG, is the closest to the ideal orientation angle characteristics 722.

In this regard, for example, near 650[nm], which corresponds to the wavelength λR, an offset 723 of about 12 [deg] is present between the orientation angle Ψe of the stacked wave plate 130 and the ideal orientation angle characteristics 722. Consequently, as described above, the transmission polarization direction 123a corresponding to the wavelength λR is designed to be tilted −12 [deg] with respect to the given direction. Further, near 450[nm], which corresponds to the wavelength λB, an offset of about −10 [deg] is present between the orientation angle Ψe of the stacked wave plate 130 and the ideal orientation angle characteristics 722. Consequently, as described above, the transmission polarization direction 121a corresponding to the wavelength λB is designed to be tilted 10 [deg] with respect to the given direction.

The retardation Γe when the stacked wave plate is operated as a λ/4 plate as depicted in FIG. 1 covers a broad band and becomes a value close to $\pi/2$ (for example, refer to FIG. 7-1). The tilt with respect to the given direction of the transmission polarization directions 121a and 123a of the polarization films 121 and 123 for the wavelengths λB and λR, is designed based on the orientation angle Ψe obtained as described.

For example, as depicted in FIG. 1, a case will be described where the polarization directions 141 to 143 of the emitted light are for circular polarization.

Figures 1, 8:
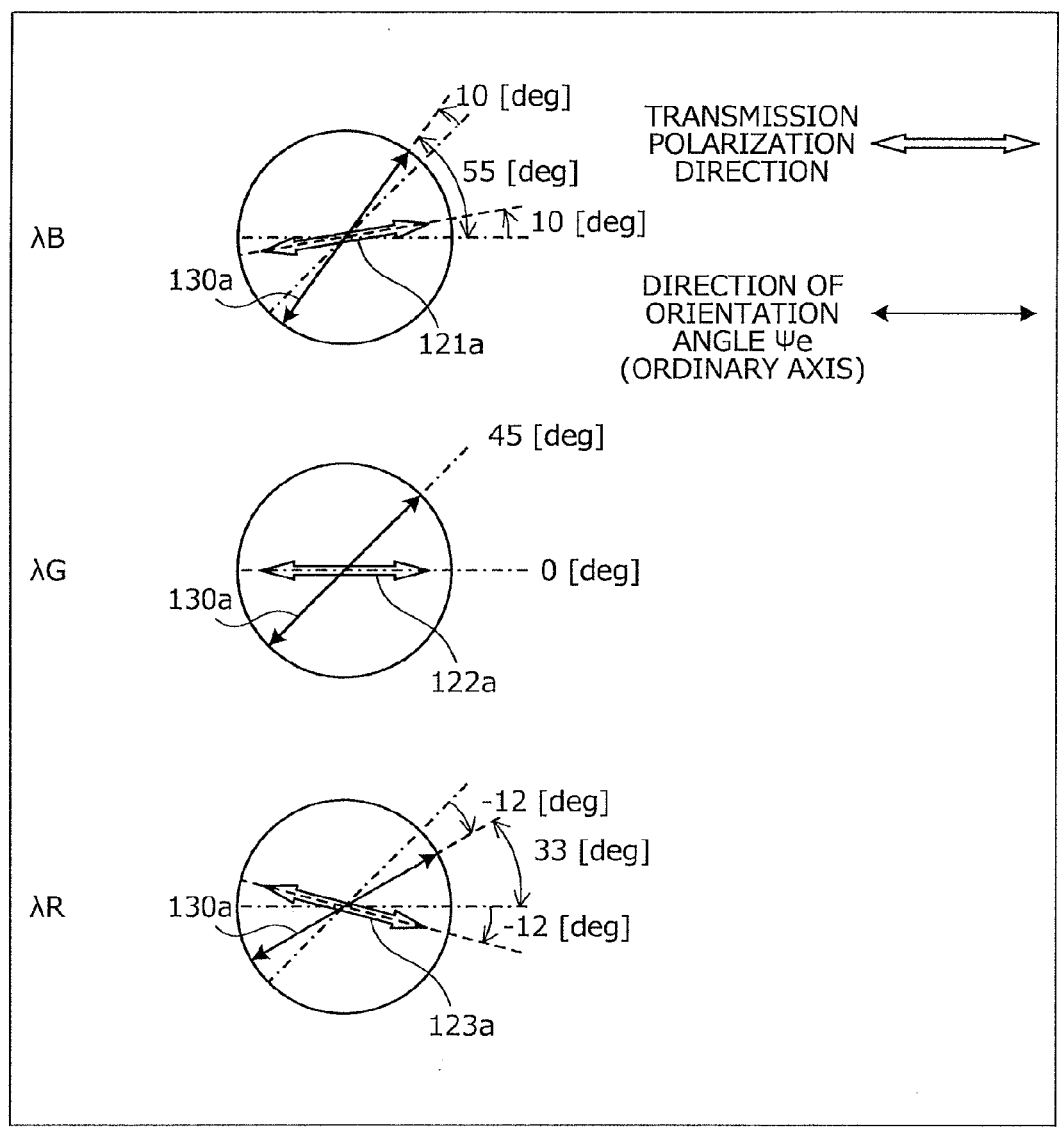
Figures 2, 8:
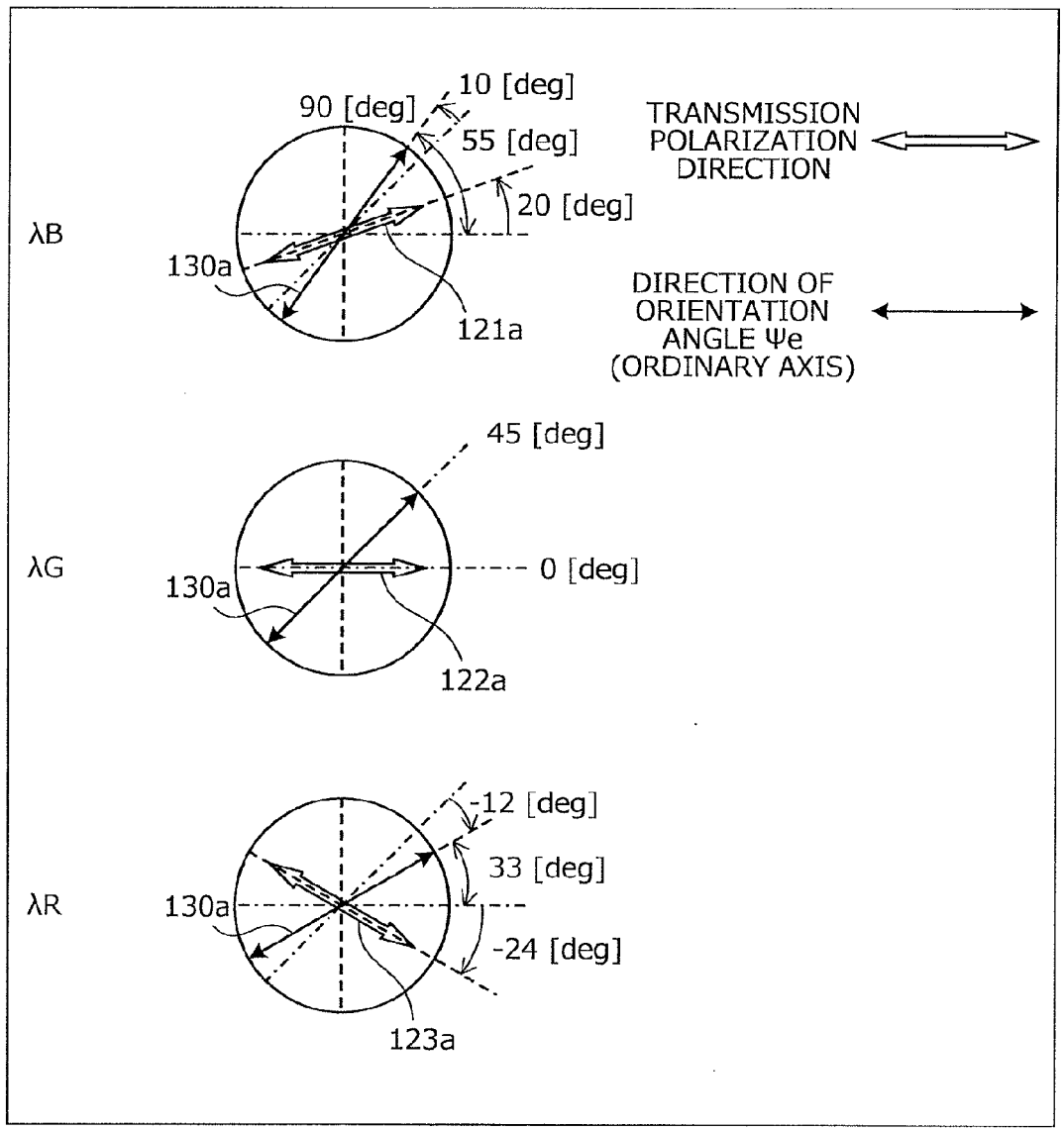

FIG. 8-1 is a diagram (part 1) depicting an example of the ordinary axis directions and transmission polarization directions in the stacked wave plate, at the polarization films respectively corresponding to each wavelength. FIG. 8-1 depicts from the top, the polarization films 121 to 123 respectively corresponding to the wavelength λB, the wavelength λG, and the wavelength λR; the respective transmission polarization directions 121a, 122a, and 123a; and the ordinary axis direction 130a of the stacked wave plate 130.

As depicted in FIG. 8-1, the transmission polarization direction 122a of the polarization film 122, which corresponds to the laser light of the wavelength λG is taken as a reference and is designed to be parallel to the given direction (0 [deg]). For the wavelength λR (650 [nm]), the orientation angle Ψe between the given direction (0 [deg]) and the ordinary axis direction 130a is 33 [deg], from FIG. 7-2. To convert linear polarization to circular polarization, the ordinary axis of a λ/4 plate has to be 45 [deg] with respect to the input linear polarization direction and therefore, in this case, the transmission polarization direction 123a is designed to be tilted −12(=33−45) [deg] with respect to the given direction such that the difference of the transmission polarization direction 123a of the polarization film 123, which is for the red laser light, and the ordinary axis direction 130a is 45 [deg]. In other words, the transmission polarization direction 123a is tilted by the offset 723 (described in FIG. 7-2) of about 12 [deg] occurring between the orientation angle Ψe of the stacked wave plate 130 and the ideal orientation angle characteristics 722.

Similarly, for the wavelength λB (450 [nm]), assuming that the orientation angle Ψe=55 [deg], from FIG. 7-2, the transmission polarization direction 121a is designed to be tilted 10 [deg] with respect to the given direction such that the difference of the ordinary axis direction 130a and the transmission polarization direction 121a of the polarization film 121, which is for the blue laser light, is 45 [deg].

On the other hand, when the stacked wave plate is operated as a λ/2 plate as depicted in FIG. 2, linear polarization that is rotated by the angle formed by the input linear polarization direction and the ordinary axis of the λ/2 plate and linear polarization that is rotated by twice this angle are transmitted. Next, as depicted in FIG. 2, a case where the polarization directions 141 to 143 of the output wavelengths are aligned in a 90 [deg] direction will be described.

FIG. 8-2 is a diagram (part 2) depicting an example of the ordinary axis directions and transmission polarization directions in the stacked wave plate, at the polarization films respectively corresponding to each the wavelength. FIG. 8-2 depicts from the top, similar to FIG. 8-1, the polarization films 121 to 123 respectively corresponding to the wavelength λB, the wavelength λG, and the wavelength λR; the respective transmission polarization directions 121a, 122a, and 123a; and the ordinary axis direction 130a of the stacked wave plate 130.

Similar to FIG. 8-1, assuming that for the wavelength λG, the orientation angle Ψe=45 [deg] and for the wavelength λR, the orientation angle Ψe=33 [deg], the transmission polarization direction 122a of the polarization film 122 that corresponds to the laser light of the wavelength λG is designed to be 0 [deg]; and the transmission polarization direction 123a of the polarization film 123 that corresponds to the laser light of the wavelength λR is arranged such that when rotated an angle that is twice the angle formed with the ordinary axis (=orientation angle Ψe), the transmission polarization direction 122a is in the 90 [deg] direction. In other words, the transmission polarization direction 123a is arranged such that the angle formed by the transmission polarization direction 123a and the 90 [deg] direction (in this case, 114 [deg]) is twice the angle formed by the transmission polarization direction 123a and ordinary axis (=orientation angle Ψe) direction (in this case, 57 [deg]). Consequently, the transmission polarization direction 123a is designed to be −24 [deg].

Similarly, assuming that for the wavelength λB, the orientation angle Ψe=55 [deg], the transmission polarization direction 121a of the polarization film 121 that corresponds to the laser light of the wavelength λB is arranged such that when rotated twice the angle formed with the ordinary axis (=orientation angle Ψe) the transmission polarization direction 121a is in the 90 [deg] direction. In other words, the transmission polarization direction 121a is arranged such that the angle formed by the transmission polarization direction 121a and 90 [deg] direction (in this case, 70 [deg]) becomes twice the angle formed by the transmission polarization direction 121a and the ordinary axis (=orientation angle Ψe) direction (in this case, 35 [deg]). Consequently, the transmission polarization direction 121a is designed to be 20 [deg].

(Relation of Polarization Directions Corresponding to Each Wavelength)

Based on the description above, the angles between the polarization directions of the light input to the stacked wave plate 130 operated as a λ/4 plate, more specifically, the angles between the transmission polarization directions 121a to 123a are as follows. In other words, the transmission polarization directions 121a to 123a are adjusted such that, of the light emitted by the laser light sources 111 to 113, the angle Ψ(λ1, λ2) between the polarization direction of the light of the wavelength λ1 and the polarization direction of the light of the wavelength λ2 satisfies Equations (18) and (19). As a result, differences in the orientation angle Ψe occurring in the stacked wave plate 130 consequent to the differences in the wavelength of the light can be corrected.

$$\Psi(\lambda 1, \lambda 2) = \arcsin\left[\frac{\sin\{\pi \cdot \Delta n2(\lambda 1) \cdot d2/\lambda 2\}\sin\{2\Psi\}}{\sin\{\Gamma e(\lambda 1)/2\}}\right] \times \frac{1}{2} - \arcsin\left[\frac{\sin\{\pi \cdot \Delta n2(\lambda 2) \cdot d2/\lambda 2\}\sin\{2\Psi\}}{\sin\{\Gamma e(\lambda 2)/2\}}\right] \times \frac{1}{2} \quad (20)$$

$$\Gamma e(\lambda) = \arccos[\cos^2\Psi\cos\{2\pi \cdot \Delta n1(\lambda) \cdot d1/\lambda + \pi \cdot \Delta n2(\lambda) \cdot d2/\lambda\} + \sin^2\Psi\cos\{2\pi \cdot \Delta n1(\lambda) \cdot d1/\lambda - \pi \cdot \Delta n2(\lambda) \cdot d2/\lambda\}] \times 2 \quad (21)$$

Equations (18) and (19) can be derived by the difference of Ψe(λ1) regarded as λ=λ1 and Ψe(λ2) regarded as λ=λ2 in equations (16) and (17). For example, the angle Ψ(λ1, λ2) between the transmission polarization direction 122a, which is the polarization direction of the green light (wavelength 512 [nm]), and the transmission polarization direction 123a, which is the polarization direction of the red light (wavelength 650 [nm]), can be calculated by assuming λ1=512 [nm] and λ2=650 [nm] in Equations (18) and (19). With respect to the transmission polarization direction 121a, which is the polarization direction of the blue light (wavelength 450 [nm]), the calculation is similar.

In Equations (18) and (19), refractive index Δn1(λ) of the wave plates 131 and 133 can be approximated by a1+b1/λ²+c1/λ⁴+d1/λ⁶ . . . from the Cauchy dispersion equation. Further, the refractive index Δn2(λ) of the wave plate 132 can be approximated by a2+b2/λ²+c2/λ⁴+d2/λ⁶ . . .

In other words, assuming the coefficients specific to the material of the wave plates 131 and 133 to be A1, A2, A3, . . . , Am (m=natural number), the refractive index Δn1(λ) of the wave plates 131 and 133 can be approximated by A1+A2/λ²+A3/λ⁴+A4/λ⁶ . . . +A(m)/λ^(2(m−1)). Furthermore, assuming the coefficients specific to the material of the wave plate 132 to be B1, B2, B3, . . . , Bm, the refractive index Δn2 (λ) of the wave plate 132 can be approximately by B1+B2/λ²+B3/λ⁴+B4/λ⁶ . . . +B(m)/λ^(2(m−1)).

Similarly, the angles between the polarization directions of the light input to the stacked wave plate 130 operated as a λ/2 plate, more specifically, the angles between the transmission polarization directions 121a to 123a are as follows. On other words, the transmission polarization directions 121a to 123a are adjusted such that, of the light emitted by the laser light sources 111 to 113, the angle Ψ(λ1, λ2) between the polarization direction of the light of the wavelength λ1 and the polarization direction of the light of the wavelength λ2 satisfies Equations (20) and (21). As a result, differences in the orientation angle Ψe occurring in the stacked wave plate 130 consequent to differences in the wavelength of the light can be corrected.

$$\Psi(\lambda 1, \lambda 2) = \Psi e(\lambda 1) - \Psi e(\lambda 2) \quad (18)$$

$$= \arcsin\left[\frac{\sin\{\pi \cdot \Delta n2(\lambda 1) \cdot d2/\lambda 1\}\sin(2\Psi)}{\sin\{\Gamma e(\lambda 2)\}/2}\right] \times \frac{1}{2} - \arcsin\left[\frac{\sin\{\pi \cdot \Delta n2(\lambda 2) \cdot d2/\lambda 2\}\sin(2\Psi)}{\sin\{\Gamma e(\lambda 2)\}/2}\right] \times \frac{1}{2}$$

$$\Gamma e(\lambda) = \arccos[\cos^2\Psi\cos\{2\pi \cdot \Delta n1(\lambda) \cdot d1/\lambda + \pi \cdot \Delta n2(\lambda) \cdot d2/\lambda\} + \sin^2\Psi\cos\{2\pi \cdot \Delta n1(\lambda) \cdot d1/\lambda - \pi \cdot \Delta n2(\lambda) \cdot d2/\lambda\}] \times 2 \quad (19)$$

Equations (20) and (21) can be derived by the difference of Ψe(λ1) regarded as λ=λ1 and Ψe(λ2) regarded as λ=λ2 in Equations (16) and (17). For example, the angle Ψ(λ1, λ2) between the transmission polarization direction 122a, which is the polarization direction of the green light (wavelength 512 [nm]), and the transmission polarization direction 123a, which is the polarization direction of the red light (wavelength 650 [nm]), can be calculated by assuming λ1=512[nm] and λ2=650[nm] in Equations (20) and (21). With respect to the transmission polarization direction 121a, which is the polarization direction of the blue light (wavelength 450[nm]), the calculation is similar.

In Equations (20) and (21), the refractive index Δn1(λ) of the wave plates 131 and 133 can be approximately by a1+b1/λ²+c1/λ⁴+d1/λ⁶ . . . from the Cauchy dispersion equation. Further, the refractive index Δn2(λ) of the wave plate 132 can be approximated by a2+b2/λ²+c2/λ⁴+d2/λ⁶ . . .

In other words, assuming the coefficients specific to the material of the wave plates 131 and 133 to be A1, A2, A3, . . . , Am (m=natural number), the refractive index $\Delta n1(\lambda)$ of the wave plates 131 and 133 can be approximated by $A1+A2/\lambda^2+A3/\lambda^4+A4/\lambda^6 \ldots +A(m)/\lambda^{(2(m-1))}$. Furthermore, assuming the coefficients specific to the material of the wave plate 132 to be B1, B2, B3, . . . , Bm, the refractive index $\Delta n2(\lambda)$ of the wave plate 132 can be approximately by $B1+B2/\lambda^2+B3/\lambda^4+B4/\lambda^6 \ldots +B(m)/\lambda^{(2(m-1))}$.

(Configuration Example of Coupling Unit)

Figures 1, 9:
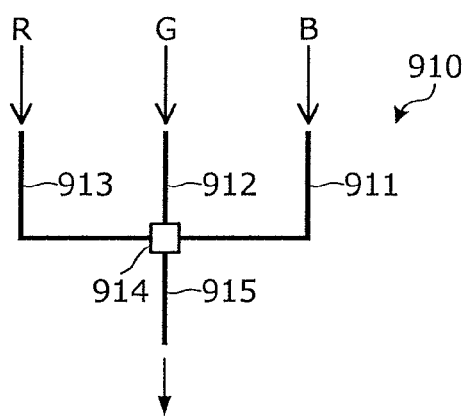
Figures 2, 9:
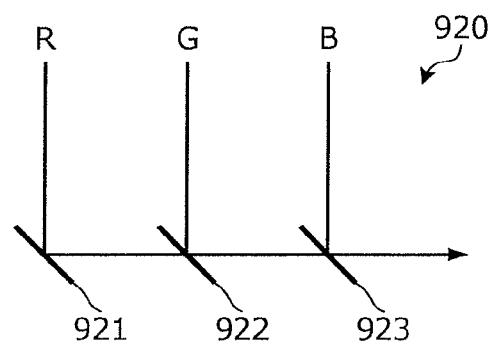
Figures 3, 9:
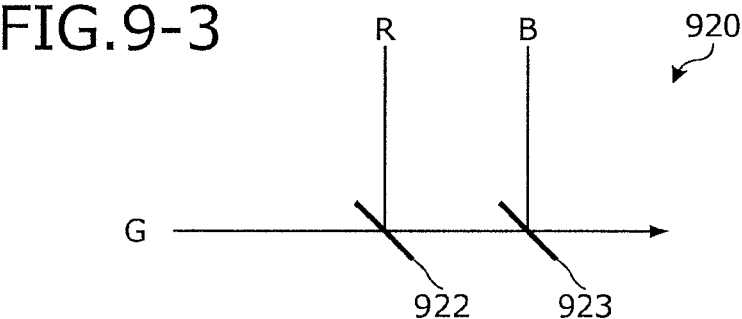
Figures 4, 9:
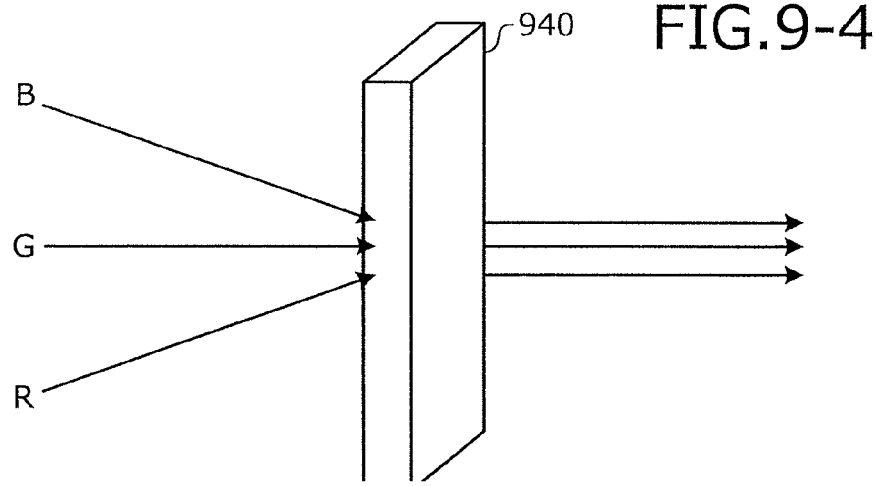

FIG. 9-1 is a diagram depicting a configuration example of the coupling unit. As depicted in FIG. 9-1, the coupling unit disposed in the optical device 100, for example, can be implemented by a fiber coupler 910. In the example depicted in FIG. 9-1, description will be given for a case where the coupling unit is disposed between the stacked wave plate 130 and the polarization films 121 to 123 (similarly with respect to FIGS. 9-2 to 9-4).

The fiber coupler 910, for example, includes polarization maintaining fibers 911 to 913, a combiner 914, and a polarization maintaining fiber 915. The polarization maintaining fibers 911 to 913, and 915, for example, are polarization maintaining fibers (PMF) that maintain the polarization state of input laser light and output the laser light.

Blue laser light (B) output from the polarization film 121 is input to the polarization maintaining fiber 911. The polarization maintaining fiber 911 maintains the polarization state of the input blue laser light (B) and outputs the blue laser light (B) to the combiner 914. Green laser light (G) output from the polarization film 122 is input to the polarization maintaining fiber 912. The polarization maintaining fiber 912 maintains the polarization state of the green laser light (G) and outputs the green laser light (G) to the combiner 914.

Red laser light (R) output from the polarization film 123 is input to the polarization maintaining fiber 913. The polarization maintaining fiber 913 maintains the polarization state of the red laser light (R) and outputs the red laser light (R) to the combiner 914. The combiner 914 is a multiplexer that multiplexes the laser light output from the polarization maintaining fibers 911 to 913. The combiner 914 outputs the multiplexed laser light to the polarization maintaining fiber 915.

The polarization maintaining fiber 915 maintains the polarization state of the laser light output from the combiner 914 and outputs the laser light. The laser light output from the polarization maintaining fiber 915 is laser light that includes red, green, and blue light. Further, the laser light output from the polarization maintaining fiber 915 is input to the stacked wave plate 130. The laser light output from the polarization films 121 to 123 can be multiplexed with the respective polarization directions maintained, and output to the stacked wave plate 130 by the fiber coupler 910 depicted in FIG. 9-1.

FIG. 9-2 is a diagram depicting a first modification example of the coupling unit. In FIG. 9-2, portions identical to those depicted in FIG. 9-1 are given the same reference numerals used in FIG. 9-1 and description thereof is omitted. As depicted in FIG. 9-2, the coupling unit disposed in the optical device 100 can be implemented by a coupling unit 920 that uses a dichroic mirror. The coupling unit 920 may include a mirror 921, and dichroic mirrors 922 and 923.

The mirror 921 reflects and outputs to the dichroic mirror 922, the red laser light (R) output from the polarization film 123. The dichroic mirror 922 reflects and outputs to the dichroic mirror 923, the green laser light (G) output from the polarization film 122. Further, the dichroic mirror 922 transmits and outputs to the dichroic mirror 923, the red laser light (R) output from the mirror 921.

The dichroic mirror 923 reflects and outputs downstream, the blue laser light (B) output from the polarization film 121. The dichroic mirror 923 further transmits and outputs downstream, the red laser light (R) and the green laser light (G) output from the dichroic mirror 922. The dichroic mirrors 922 and 923 can each be implemented by, for example, dielectric multilayers.

The laser light output from the dichroic mirror 923 is laser light that includes red, green, and blue light. Further, the laser light output from the dichroic mirror 923 is input to the stacked wave plate 130. The laser light output from the polarization films 121 to 123 can be multiplexed with the respective polarization directions maintained, and output to the stacked wave plate 130 by the coupling unit 920 that is depicted in FIG. 9-2 and uses a dichroic mirror.

FIG. 9-3 is a diagram depicting a second modification example of the coupling unit. In FIG. 9-3, portions identical to those depicted in FIG. 9-2 are given the same reference numerals used in FIG. 9-2 and description thereof is omitted. As depicted in FIG. 9-3, the coupling unit 920 that uses a dichroic mirror may be configured to omit the mirror 921 in the configuration depicted in FIG. 9-2.

The dichroic mirror 922 reflects and outputs to the dichroic mirror 923, the red laser light (R) output from the polarization film 123. The dichroic mirror 922 further transmits and outputs to the dichroic mirror 923, the green laser light (G) output from the polarization film 122. In this manner, the red laser light (R) output from the polarization film 123 and the green laser light (G) output from the polarization film 122 is input to the dichroic mirror 922, whereby the mirror 921 depicted in FIG. 9-2 may be omitted.

FIG. 9-4 is a diagram depicting a third modification example of the coupling unit. As depicted in FIG. 9-4, the coupling unit disposed in the optical device 100 may be implemented by a holographic coupler 940. The holographic coupler 940 is a volume hologram recorded such that the diffraction angle differs according to wavelength. The laser light output from the polarization films 121 to 123 collects at the holographic coupler 940 and when being transmitted by the holographic coupler 940, is output in the same direction by diffraction of an angle that corresponds to wavelength.

The laser light output from the polarization films 121 to 123 can be multiplexed with the respective polarization directions maintained, and output to the stacked wave plate 130 by the holographic coupler 940 depicted in FIG. 9-4.

As described, according to optical device, deviation of the polarization directions of the wavelength components can be suppressed. Further, for example, increases in apparatus size can be suppressed as compared to a configuration that disposes multiple wave plates optimized for each wavelength component, to obtain a given retardation for each the wavelength component.

In the embodiment, although the laser light sources 111 to 113 have been given as one example of the light sources, the light sources are not limited to the laser light sources 111 to 113, and for example, may be 2, or 4 or more light sources, each emitting laser light of a different wavelength. Further, the wavelength of the laser light is not limited to 450 [nm] (blue), 512 [nm] (green), and 650 [nm] (red) and an arbitrary wavelength may be used.

Further, in the embodiment, although the polarization axes of the polarization films for each color are rotated to an optimal angle, the angles of the laser light sources may be adjusted such that the transmission polarization directions 121a, 122a, and 123a substantially coincide. As a result, optical loss at the polarization films 121 to 123 can be suppressed. In this case, a configuration that omits the polarization films 121 to 123 is possible. In this case, a member that adjusts the angle of the laser light sources 111 to 113 is the polarization adjusting unit that adjusts the polarization directions of the light.

Although a configuration in which the optical device 100 has a function of an attenuator has been described, apparatuses to which the optical device 100 can be applied are not limited hereto. For example, the optical device 100 depicted in FIG. 1 can be applied to a projector and the like.

INDUSTRIAL APPLICABILITY

As described, the optical device according to the present invention is useful for an optical device that outputs light of multiple wavelengths, in a given polarization direction; and is particularly suitable for an attenuator and the like that change optical intensity according to polarization direction.

The attenuator, for example, can be used in a head-up display in a vehicle, aircraft, etc., and is useful for changing the brightness of display, according to the brightness of the environment while driving/flying. Compared to adjusting output on the light source side, the use of an attenuator based on the present invention enables faster adjustment of the overall amount of light, with the color tone as is. Furthermore, the attenuator can be used commonly for multiple light source wavelengths, thereby enabling reductions in size.

When the optical device is used as an attenuator, the stacked wave plate is operated as a $\lambda/2$ plate and the linear polarization output when voltage is applied is designed to be orthogonal to the polarization film, thereby enabling a dark state to be obtained. In this dark state, the output polarization direction differs according to wavelength and therefore, hue can be adjusted by adjusting the light source intensity.

EXPLANATIONS OF LETTERS OR NUMERALS 100 optical device
111 to 113 laser light sources
121 to 123, 210 polarization films
121a, 122a, 123a transmission polarization directions
130 stacked wave plate
130a, 131a, 132a, 133a ordinary axis directions
131 to 133 wave plates
141 to 143, 211 polarization directions
301 to 303 transmittance characteristics
310 voltage range
600, 711 to 713 retardation characteristics
721, 722 orientation angle characteristics
723 offset
910 fiber coupler
911 to 913, 915 polarization maintaining fibers
914 combiner
920 coupling unit
921 mirror
922, 923 dichroic mirrors
940 holographic coupler

The invention claimed is:

1. An optical device comprising:
   a plurality of light sources configured to respectively emit light of a different wavelength;
   a stacked wave plate that is configured by a plurality of wave plates disposed in series, transmits the light emitted by the plurality of light sources, and induces a phase difference on polarization components of the transmitted light; and
   a plurality of polarization adjusting units configured to receive light from a respective light source and to respectively adjust polarization directions of the light from said respective light source such that an angle between the polarization directions of the light emitted by the plurality of light sources and input to the same stacked wave plate becomes an angle that corrects an orientation angle difference that occurs at the stacked wave plate and is caused by differences in the wavelengths of the light.

2. The optical device according to claim 1, wherein the plurality of wave plates includes:
   a first wave plate for which an ordinary axis is set in a given direction,
   a second wave plate that is disposed downstream to the first wave plate and for which the ordinary axis is set in a direction different from the given direction, and
   a third wave plate that is disposed downstream to the second wave plate and for which the ordinary axis is set in the given direction.

3. The optical device according to claim 2, wherein the plurality of light sources includes:
   a light source configured to emit light of a wavelength $\lambda 1$, and
   a light source configured to emit light of a wavelength $\lambda 2$ that is different from the wavelength $\lambda 1$,
   the first wave plate is configured to have a thickness d1 and a refractive index $\Delta n1(\lambda)$ that changes according to the wavelength $\lambda$ of the transmitted light,
   the second wave plate is configured to have a thickness d2 and a refractive index $\Delta n2(\lambda)$ that changes according to the wavelength $\lambda$ of the transmitted light,
   the polarization adjusting unit adjusts the polarization directions of the light of the wavelength $\lambda 1$ and the light of the wavelength $\lambda 2$ such that an angle $\Psi(\lambda 1, \lambda 2)$ between the polarization directions of the light of the wavelength $\lambda 1$ and the light of the wavelength $\lambda 2$ satisfies:

$$\Psi(\lambda 1, \lambda 2) = \arcsin\left[\frac{\sin\{\pi \cdot \Delta n2(\lambda 1) \cdot d2/\lambda 1\}\sin(2\Psi)}{\sin\{\Gamma e(\lambda 1)\}/2}\right] \times \frac{1}{2} -$$
$$\arcsin\left[\frac{\sin\{\pi \cdot \Delta n2(\lambda 2) \cdot d2/\lambda 2\}\sin(2\Psi)}{\sin\{\Gamma e(\lambda 2)\}/2}\right] \times \frac{1}{2}$$

$$\Gamma e(\lambda) = \arccos[\cos^2\Psi\cos\{2\pi \cdot \Delta n1(\lambda) \cdot d1/\lambda + \pi \cdot \Delta n2(\lambda) \cdot d2/\lambda\} +$$
$$\sin^2\Psi\cos\{2\pi \cdot \Delta n1(\lambda) \cdot d1/\lambda - \pi \cdot \Delta n2(\lambda) \cdot d2/\lambda\}] \times 2$$

where, an angle between the ordinary axes of the first wave plate and the second wave plate is $\Psi$.

4. The optical device according to claim 3, wherein the refractive index $\Delta n1(\lambda)$ is approximated by $a1+b1/\lambda^2+c1/\lambda^4+d1/\lambda^6+, \ldots$ (where, a1, b1, c1, d1, ... are coefficients specific to a material of the first wave plate), and
the refractive index $\Delta n2(\lambda)$ is approximated by $a2+b2/\lambda^2+c2/\lambda^4+d2/\lambda^6+, \ldots$ (where, a2, b2, c2, d2, ... are coefficients specific to a material of the second wave plate).

5. The optical device according to claim 4, wherein
the second wave plate is a liquid crystal cell in which the phase difference induced on the polarization components of the light changes according to voltage applied thereto.

6. The optical device according to claim 5, further comprising
a polarizer configured to transmit only a given polarization component of the light transmitted by the stacked wave plate.

7. The optical device according to claim 6, wherein
the polarization adjusting unit is a plurality of polarizers respectively disposed for each light source among the plurality of light sources and respectively transmitting to the stacked wave plate, only a polarization component of a given transmission polarization direction of the light emitted by a corresponding light source among the plurality of light sources, and
respective transmission polarization directions of the plurality of polarizers are set such that the angle between the polarization directions of the light transmitted to the stacked wave plate becomes the angle that corrects the orientation angle difference.

8. The optical device according to claim 7, further comprising
a coupling unit configured to multiplex the light for which the polarization directions have been adjusted by the polarization adjusting unit, while maintaining the polarization directions of the light, wherein
the light that has been multiplexed by the coupling unit and transmitted by the stacked wave plate is output.

9. The optical device according to claim 3, wherein
the second wave plate is a liquid crystal cell in which the phase difference induced on the polarization components of the light changes according to voltage applied thereto.

10. The optical device according to claim 9, further comprising
a polarizer configured to transmit only a given polarization component of the light transmitted by the stacked wave plate.

11. The optical device according to claim 1, wherein
the polarization adjusting unit is a plurality of polarizers respectively disposed for each light source among the plurality of light sources and respectively transmitting to the stacked wave plate, only a polarization component of a given transmission polarization direction of the light emitted by a corresponding light source among the plurality of light sources, and
respective transmission polarization directions of the plurality of polarizers are set such that the angle between the polarization directions of the light transmitted to the stacked wave plate becomes the angle that corrects the orientation angle difference.

12. The optical device according to claim 11, wherein the polarizers rotate the polarization axes of the polarizers to an optimum angle.

13. The optical device according to claim 1, further comprising
a coupling unit configured to multiplex the light for which the polarization directions have been adjusted by the polarization adjusting unit, while maintaining the polarization directions of the light, wherein
the light that has been multiplexed by the coupling unit and transmitted by the stacked wave plate is output.

* * * * *